US012746626B2

(12) United States Patent
Lingnau

(10) Patent No.: US 12,746,626 B2
(45) Date of Patent: Sep. 29, 2026

(54) PARALLEL ROBOTICS SYSTEM AND METHOD OF INDUCTION KINETIC HYBRID WELDING PROCESSES

(71) Applicant: Spinduction Weld Inc., Calgary (CA)

(72) Inventor: David Grant Lingnau, Calgary (CA)

(73) Assignee: Spinduction Weld Inc., Calgary (CA)

( * ) Notice: Subject to any disclaimer, the term of this patent is extended or adjusted under 35 U.S.C. 154(b) by 469 days.

(21) Appl. No.: 18/104,222

(22) Filed: Jan. 31, 2023

(65) Prior Publication Data

US 2024/0207983 A1 Jun. 27, 2024

Related U.S. Application Data

(60) Provisional application No. 63/305,231, filed on Jan. 31, 2022.

(51) Int. Cl.
*B23K 37/053* (2025.01)
*B23K 13/02* (2006.01)
(Continued)

(52) U.S. Cl.
CPC .......... *B23K 37/053* (2013.01); *B23K 13/025* (2013.01); *B25J 9/003* (2013.01); *B23K 2101/06* (2018.08)

(58) Field of Classification Search
CPC ...... B23K 20/26; B23K 20/12; B23K 37/053; B23K 37/0452; B23K 9/003
See application file for complete search history.

(56) References Cited

U.S. PATENT DOCUMENTS 5,240,167 A 8/1993 Ferte et al.
6,007,923 A * 12/1999 Shimizu ................. C22C 14/00 420/419

(Continued)

FOREIGN PATENT DOCUMENTS

CA 2349339 A1 5/2000
CA 2663667 A1 4/2008

(Continued)

OTHER PUBLICATIONS

Extended European Search Report issued by the European Patent Office on Jan. 2026, 2026, parallel pending European Patent Application 23746540.6.

*Primary Examiner* — Thien S Tran
(74) *Attorney, Agent, or Firm* — Amburn Law PLLC; Dean W. Amburn

(57) ABSTRACT

With the present invention, the combination of amplitudes and velocities of rotary and axial motions required for an Induction-Kinetic Welding (IKW) process are achieved with Stewart Platforms, also known as parallel actuators, which typically have 6-DoF. The 6-DoF systems are used to generate the kinetic heating essential to the IKW process. Another new welding process uses only axial (longitudinal) motion, in contrast to prior systems which rely upon some form of transverse shear motion. The present invention takes advantage of this new single axis IKW discovery in combination with the 6-DoF discovery to enable an entirely new spectrum of welding capabilities for the IKW process. In an embodiment the system includes a claim shell type apparatus allowing for opening and closing the welding system around the components to be welded.

20 Claims, 18 Drawing Sheets

Standard Configuration 6-DOF Parallel Actuator

(51) Int. Cl.
*B23K 101/06* (2006.01)
*B25J 9/00* (2006.01)

(56) References Cited

U.S. PATENT DOCUMENTS

| | | | | |
|---|---|---|---|---|
| 6,196,081 | B1 * | 3/2001 | Yau | B23Q 3/18<br>901/29 |
| 6,637,642 | B1 * | 10/2003 | Lingnau | B23K 20/129<br>219/601 |
| 9,644,769 | B1 * | 5/2017 | Cheng | B23K 28/02 |
| 11,072,036 | B2 * | 7/2021 | Lingnau | B23K 13/015 |
| 11,413,699 | B2 * | 8/2022 | Cheng | B23K 20/023 |
| 2009/0145948 | A1 * | 6/2009 | Pfeiler | B23K 20/1205<br>228/2.1 |
| 2010/0038404 | A1 * | 2/2010 | Lingnau | B23K 20/12<br>228/2.1 |

FOREIGN PATENT DOCUMENTS

| | | | | | |
|---|---|---|---|---|---|
| CN | 105880882 | A | * | 8/2016 | B23K 37/0211 |
| CN | 111787655 | A | * | 10/2020 | H05B 6/101 |
| WO | 2021170604 | A1 | | 9/2021 | |

* cited by examiner

FIG. 1A, Process Graph, 6-DoF IKW, Practice Run #CR0005
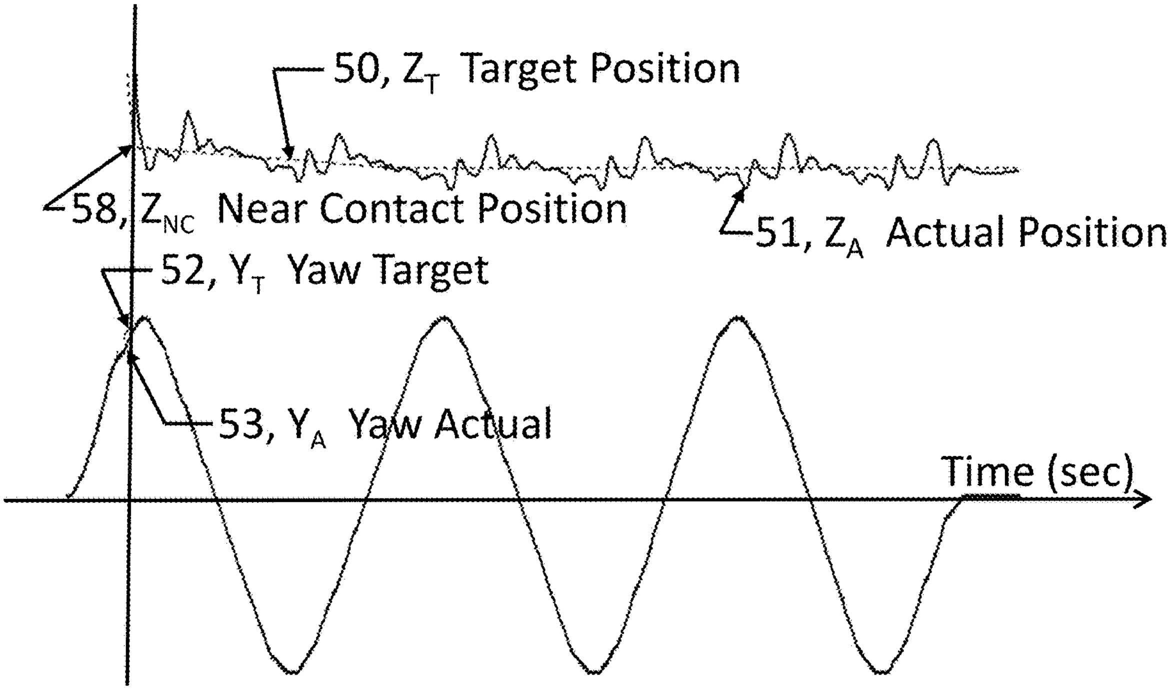
FIG. 1B, Process Graph, 6-DoF IKW, Weld #XPW0005
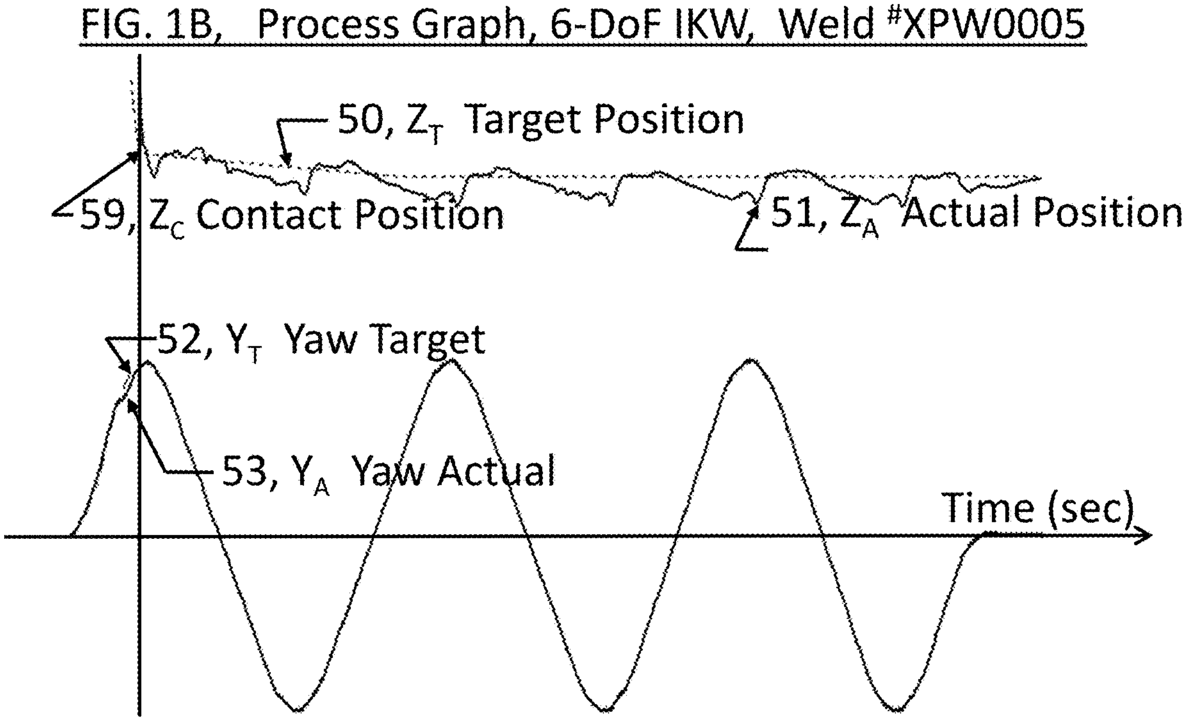

FIG. 1C, Magnified View of Practice Run #CR0005
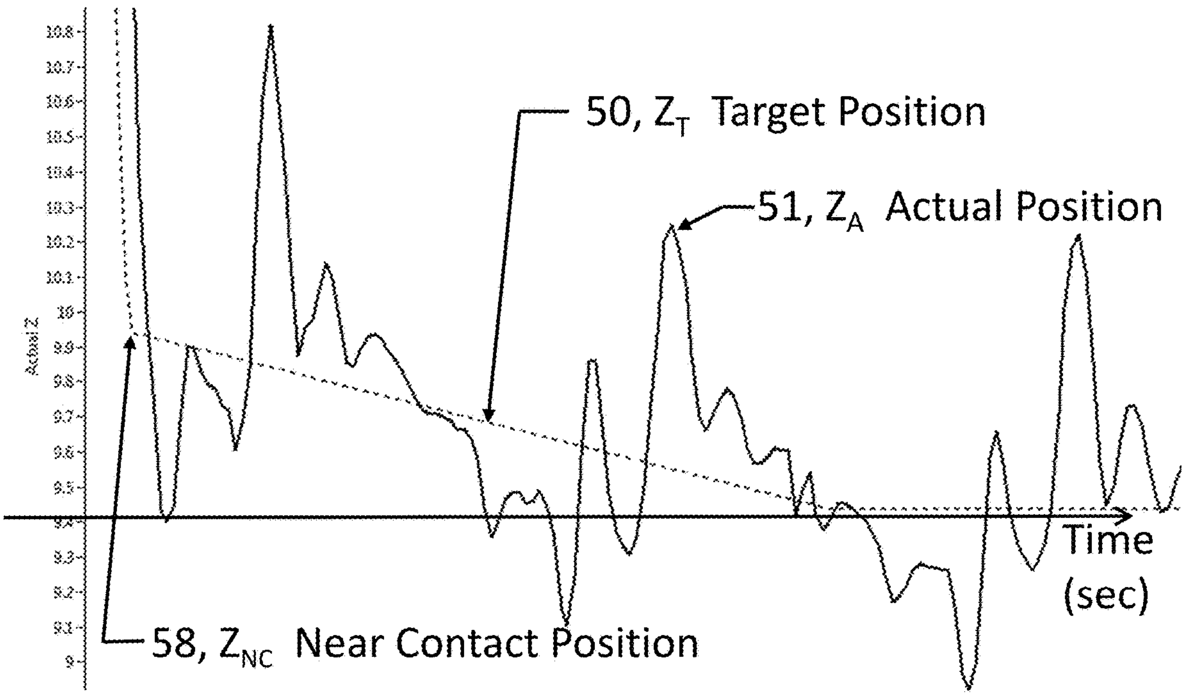
FIG. 1D, Magnified View of Weld #XPW0005
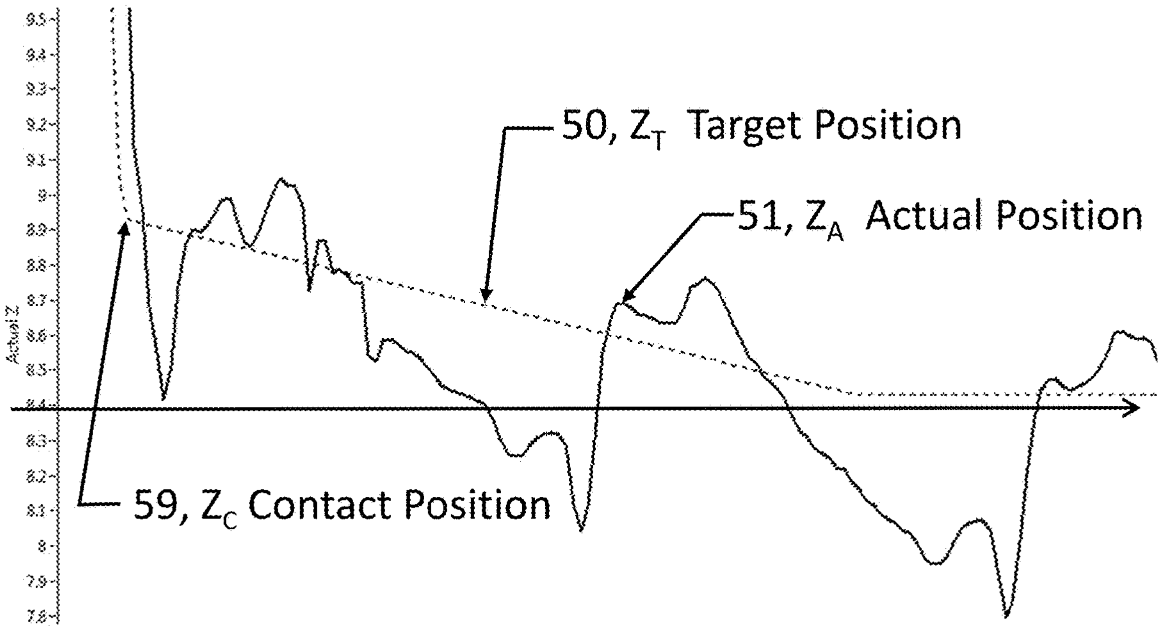

FIG. 2, Process Graph for Single Axis IKW
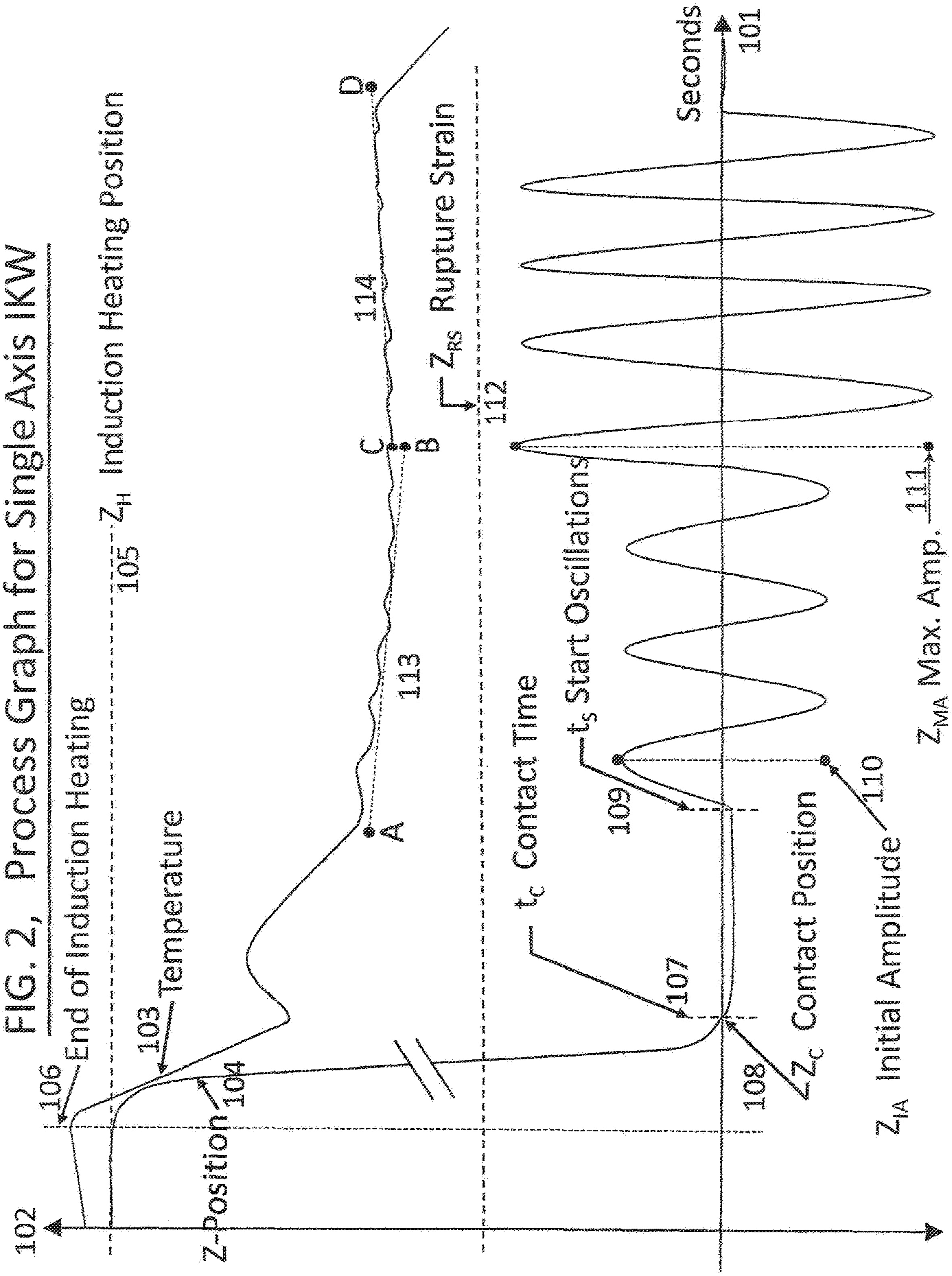

Figure 3, Standard Configuration 6-DOF Parallel Actuator
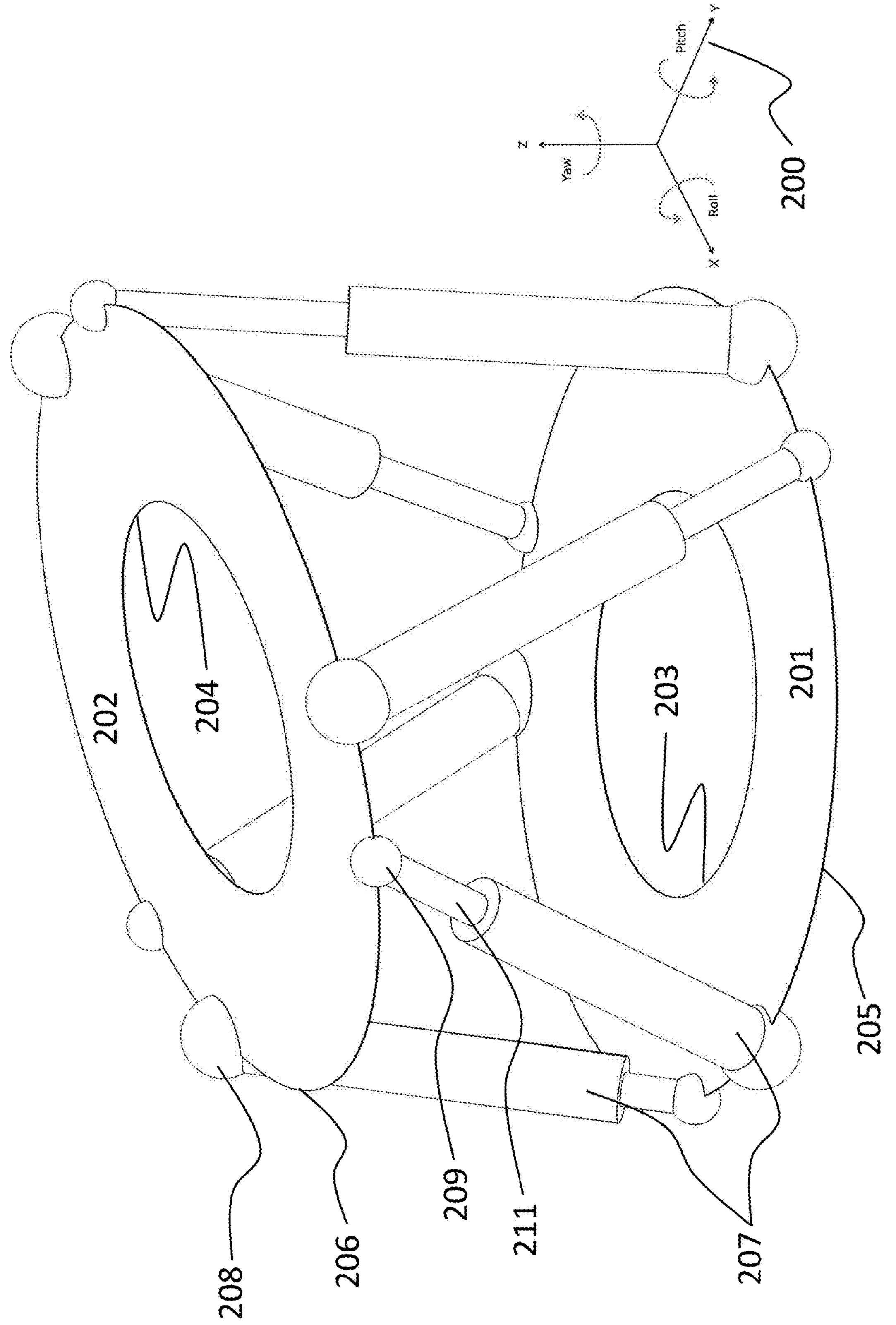

Figure 4, Trunion Configuration 6-DOF Parallel Actuator
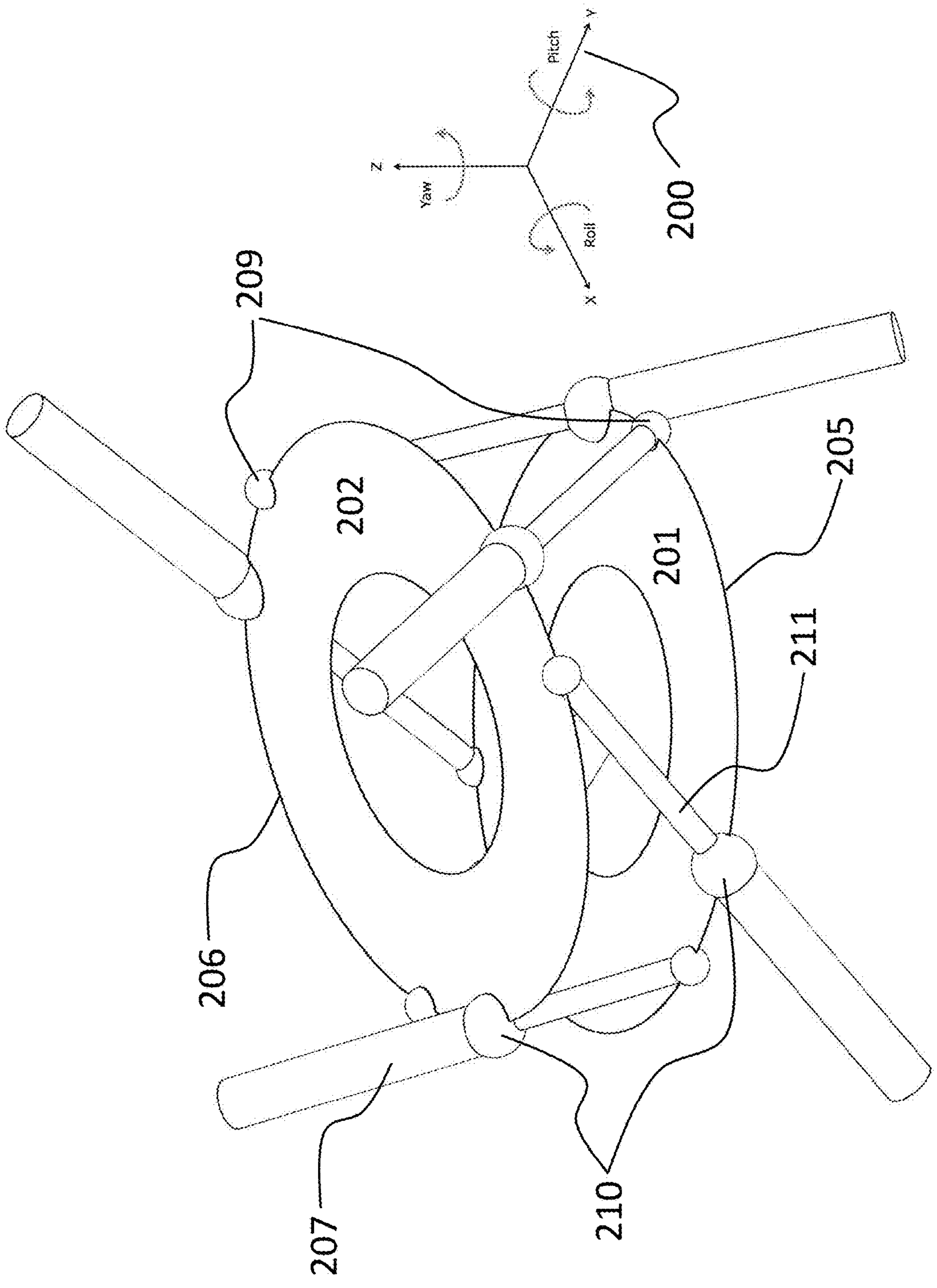

Figure 5, Inverted Configuration 6-DOF Parallel Actuator
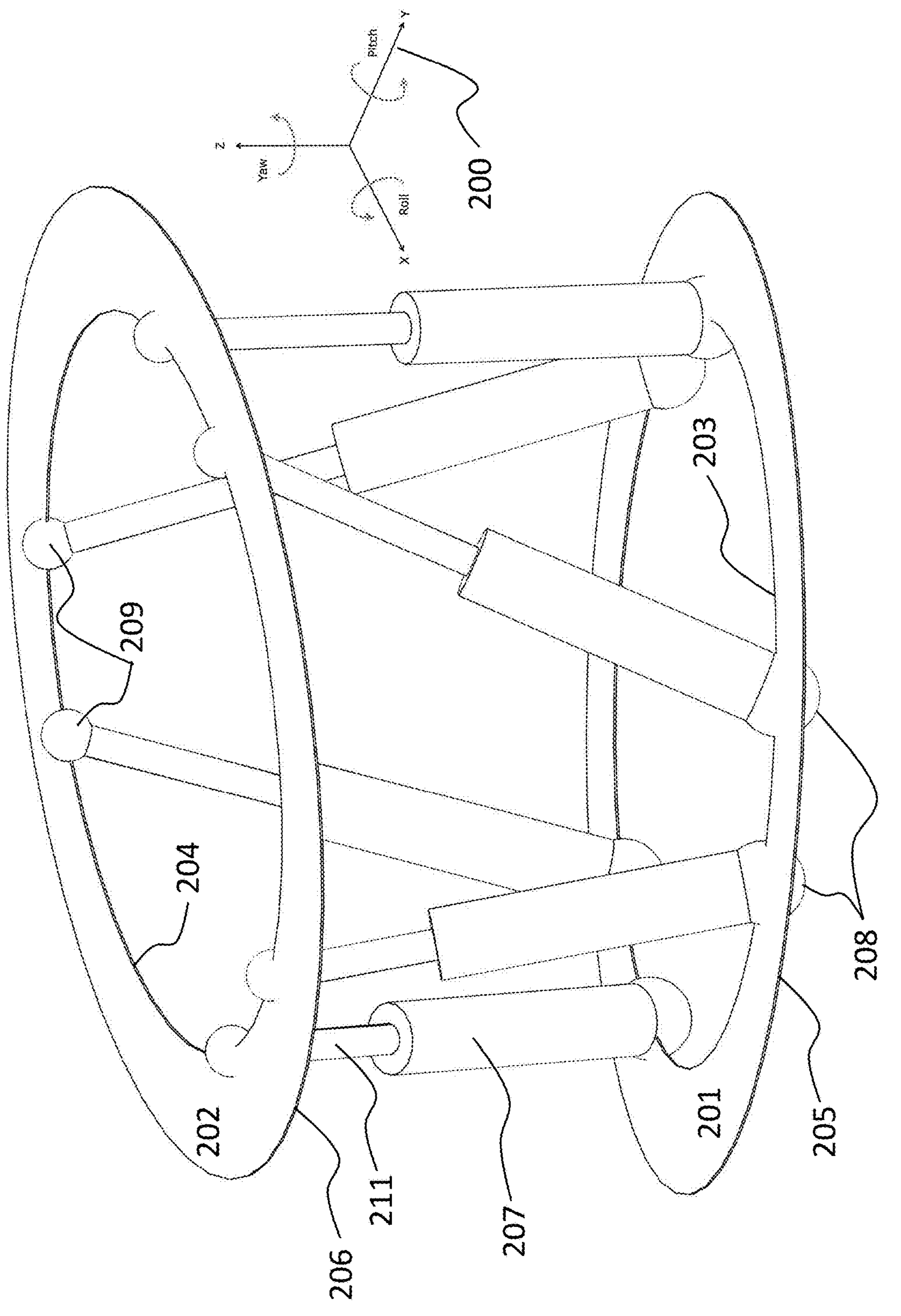

Figure 6, Circular Tripod Array 6-DOF Parallel Actuator
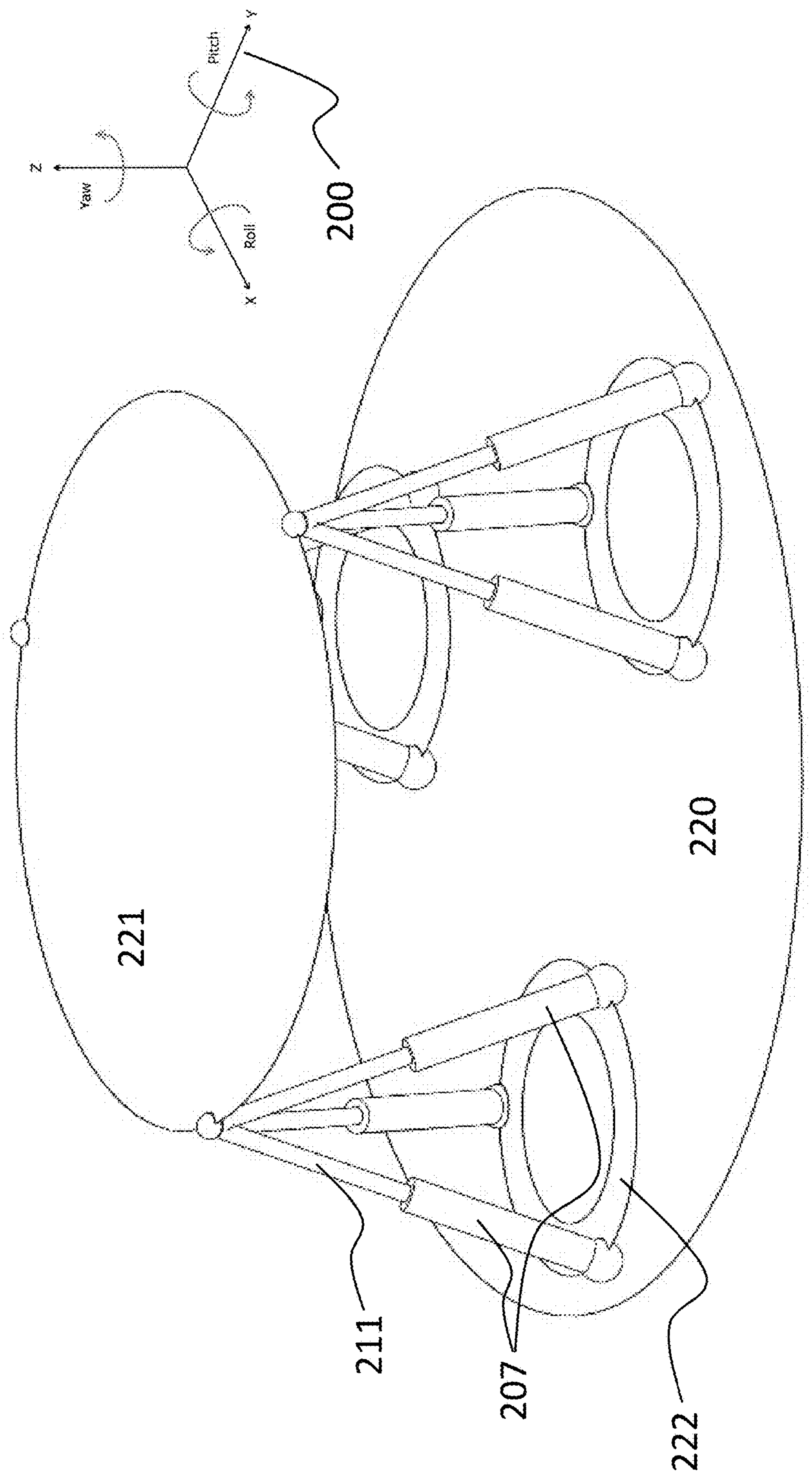

Figure 7, Rectangular Tripod Array 6-DOF Parallel Actuator
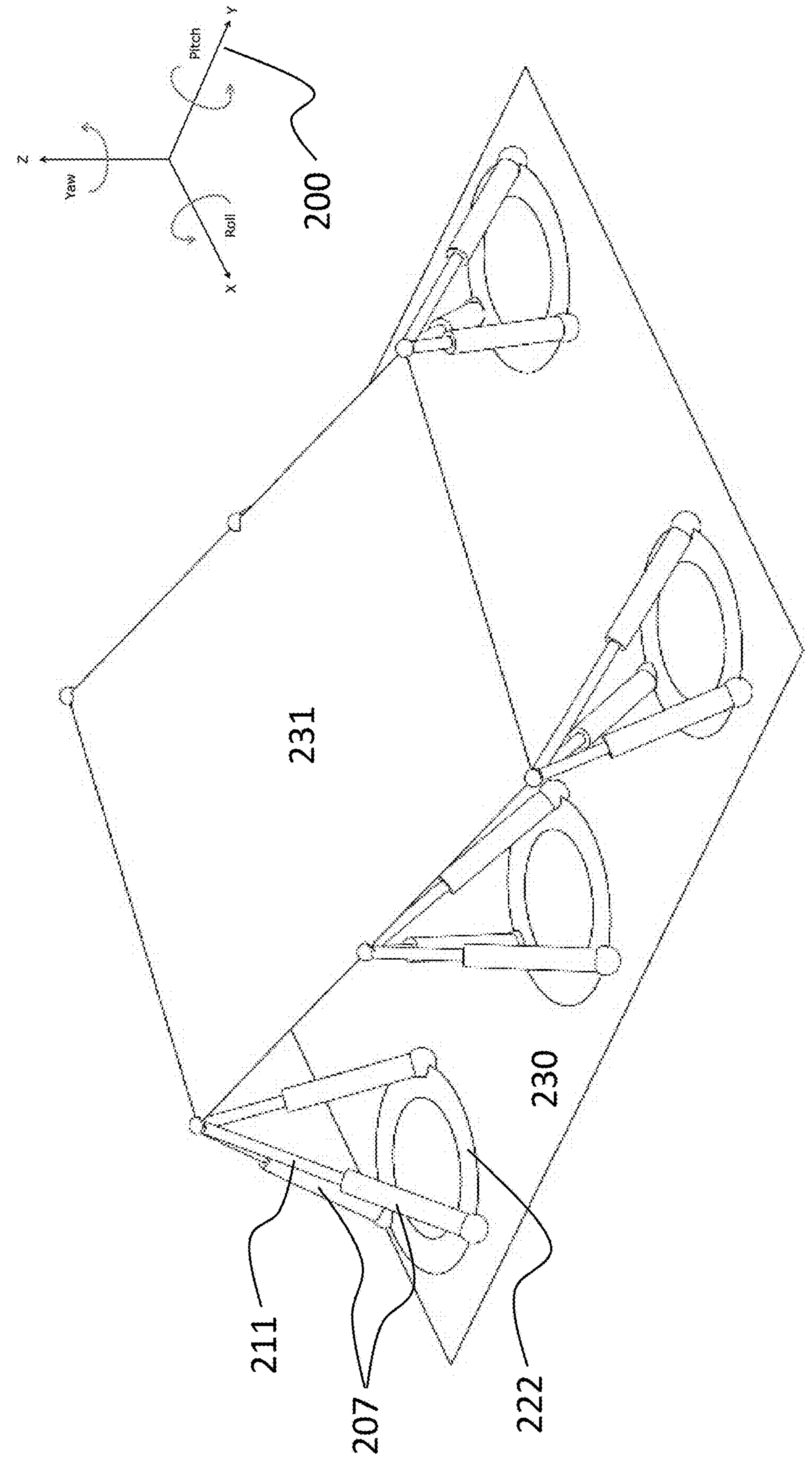

FIG. 8, 6-DOF Feedthrough IKW System
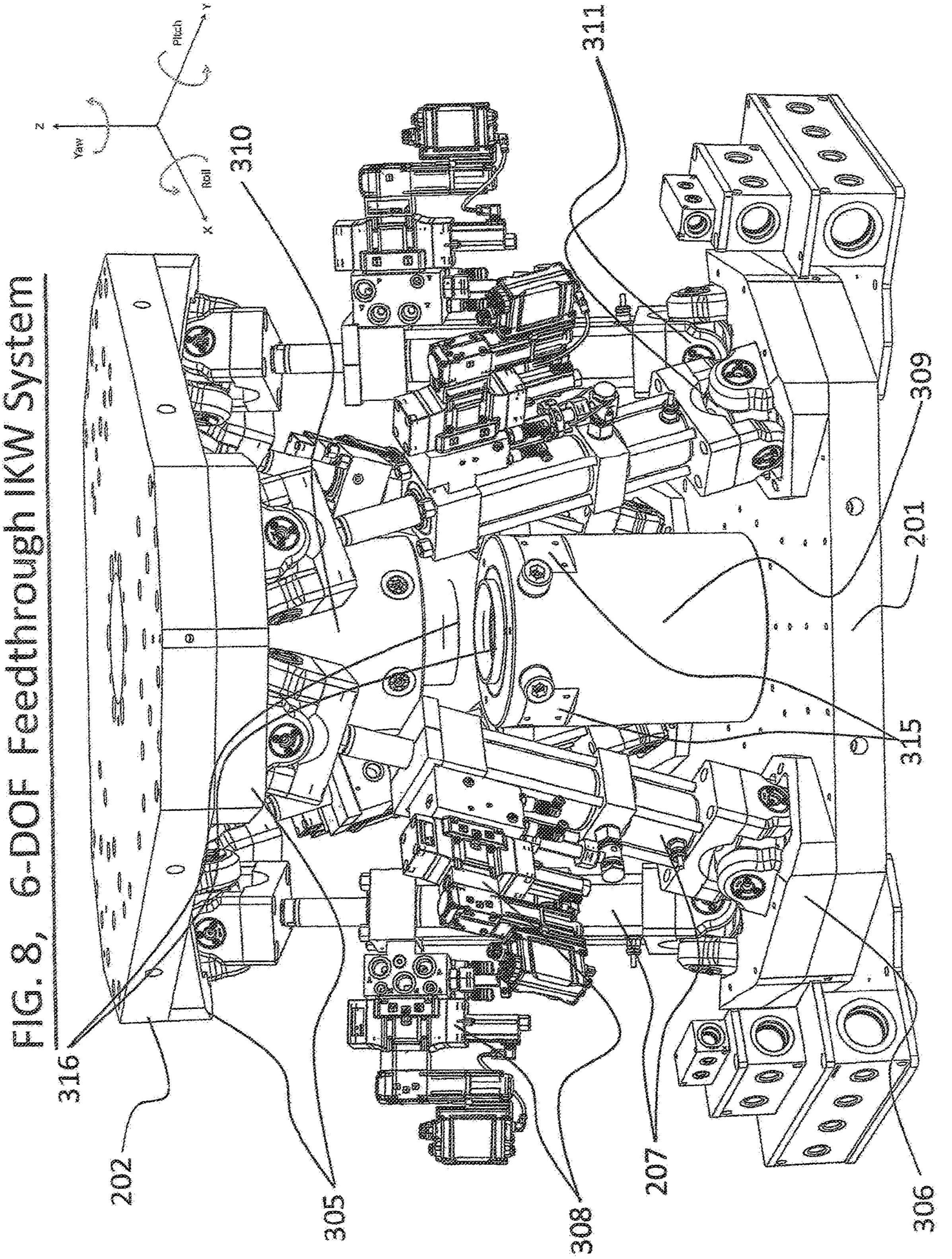

Figure 9, 6-DOF Feedthrough IKW Weld Chamber
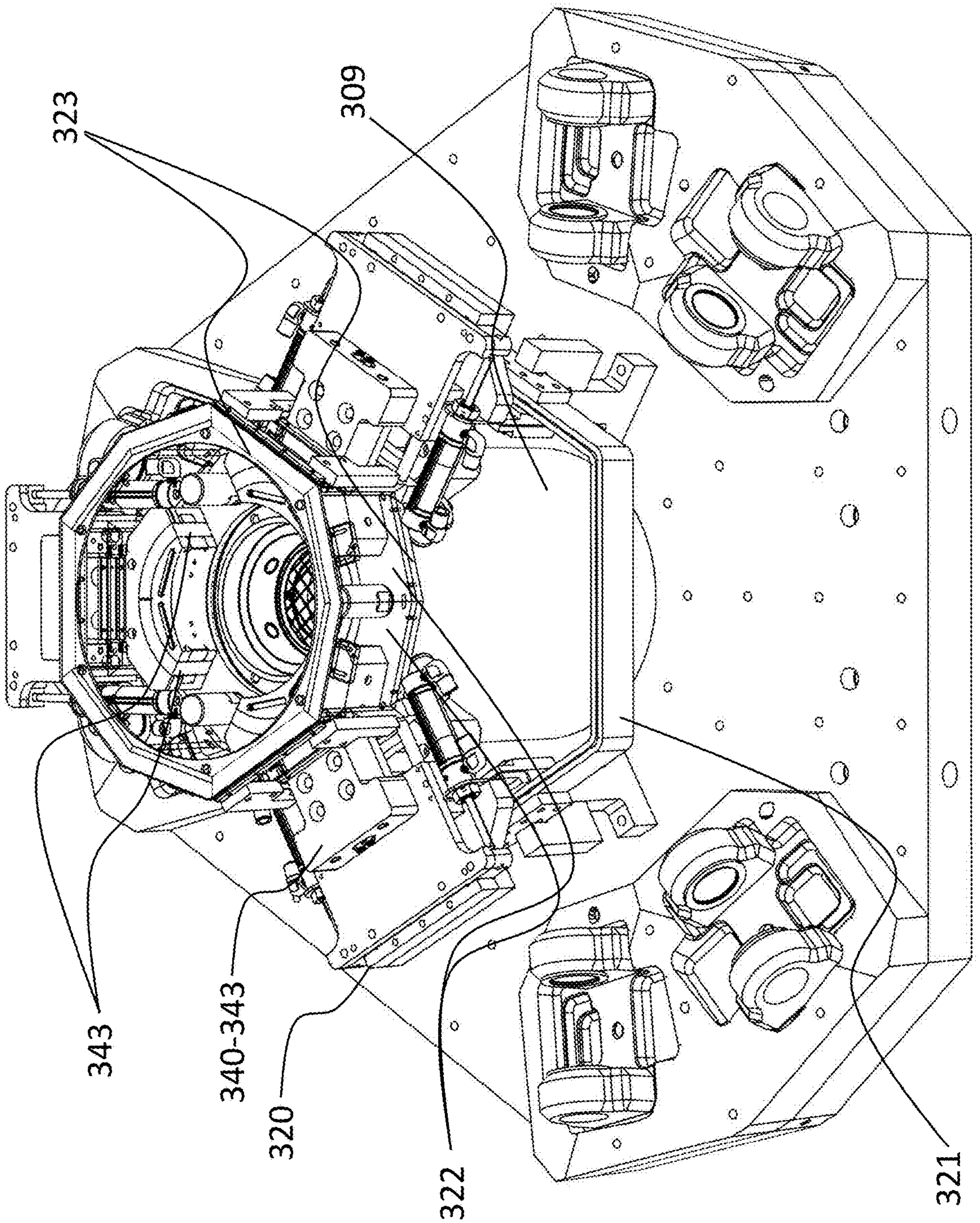

Figure 10, Induction Coil Segment Unit (320)
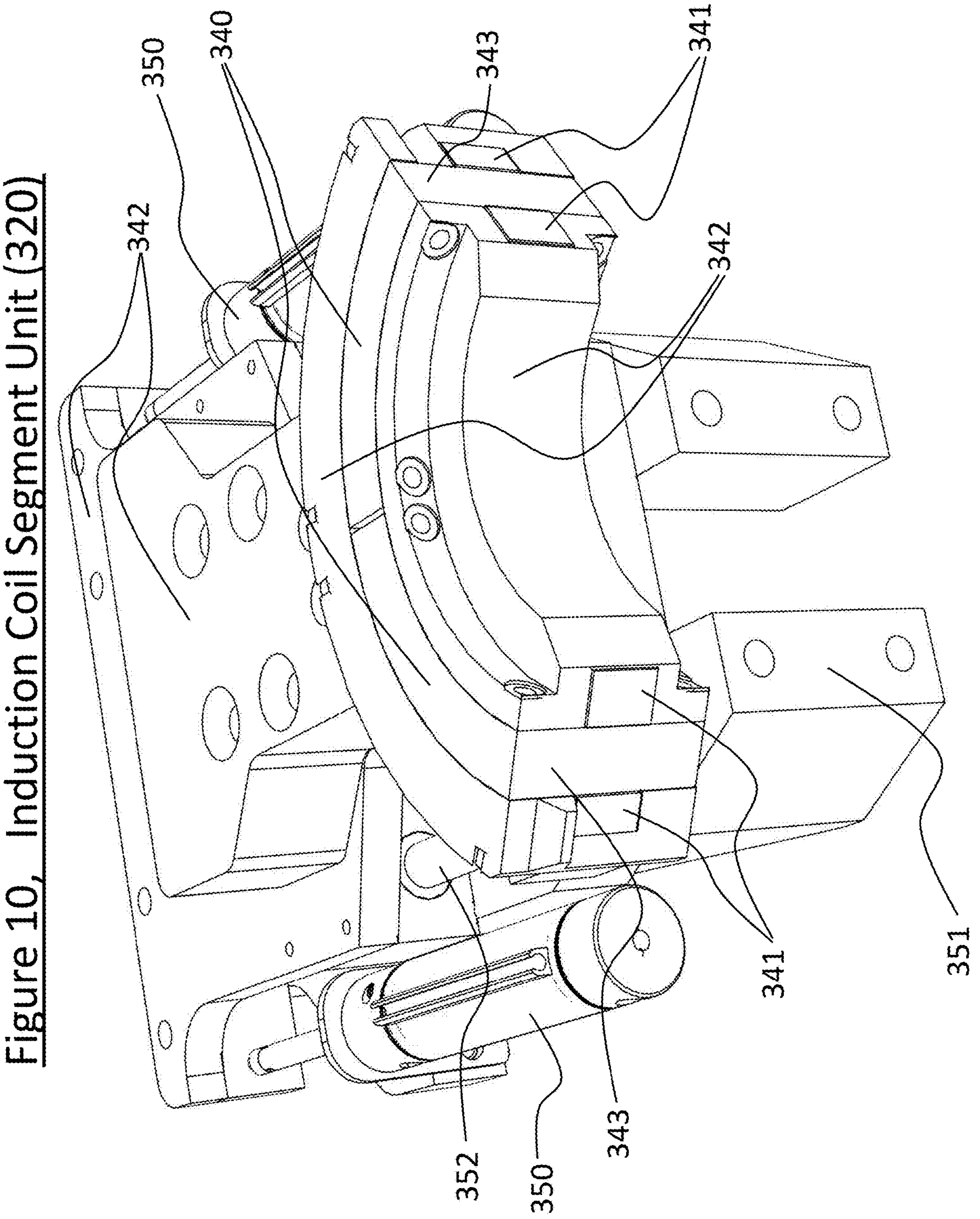

Figure 11, 6-DOF Clamshell IKW System, Front Oblique
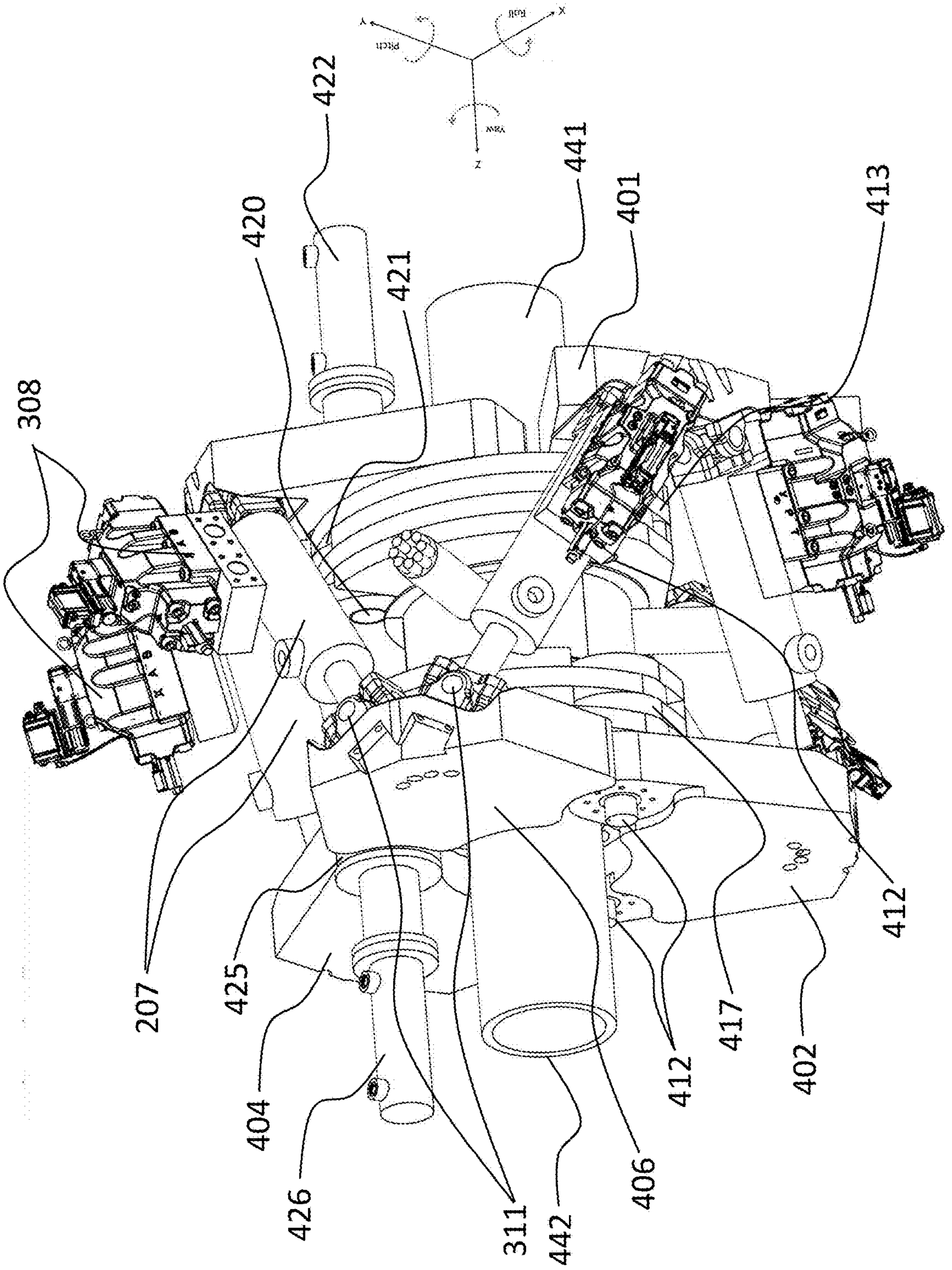

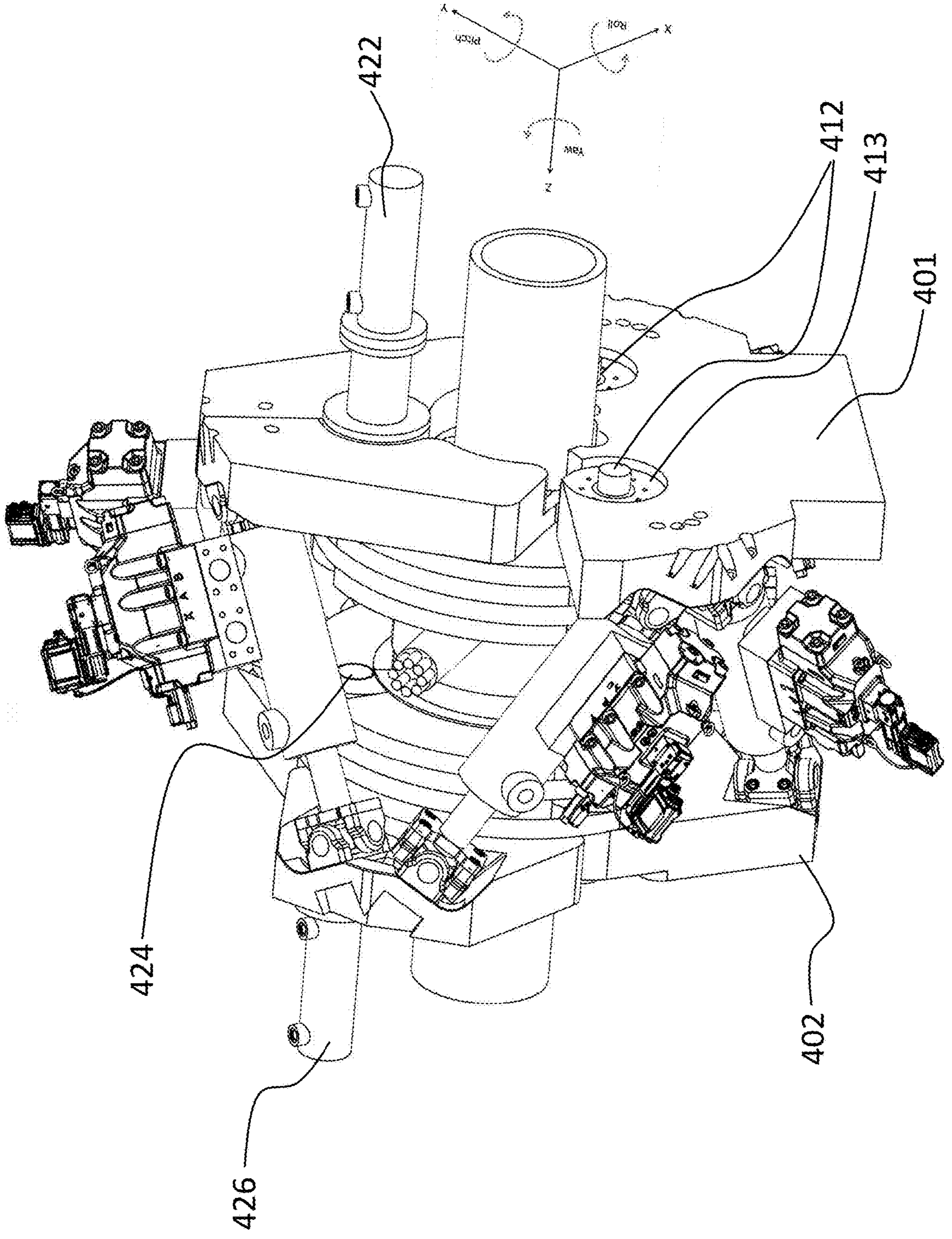
Figure 12, 6-DOF Clamshell IKW System Back Oblique

Figure 13, 6+4DoF Clamshell IKW System Front View
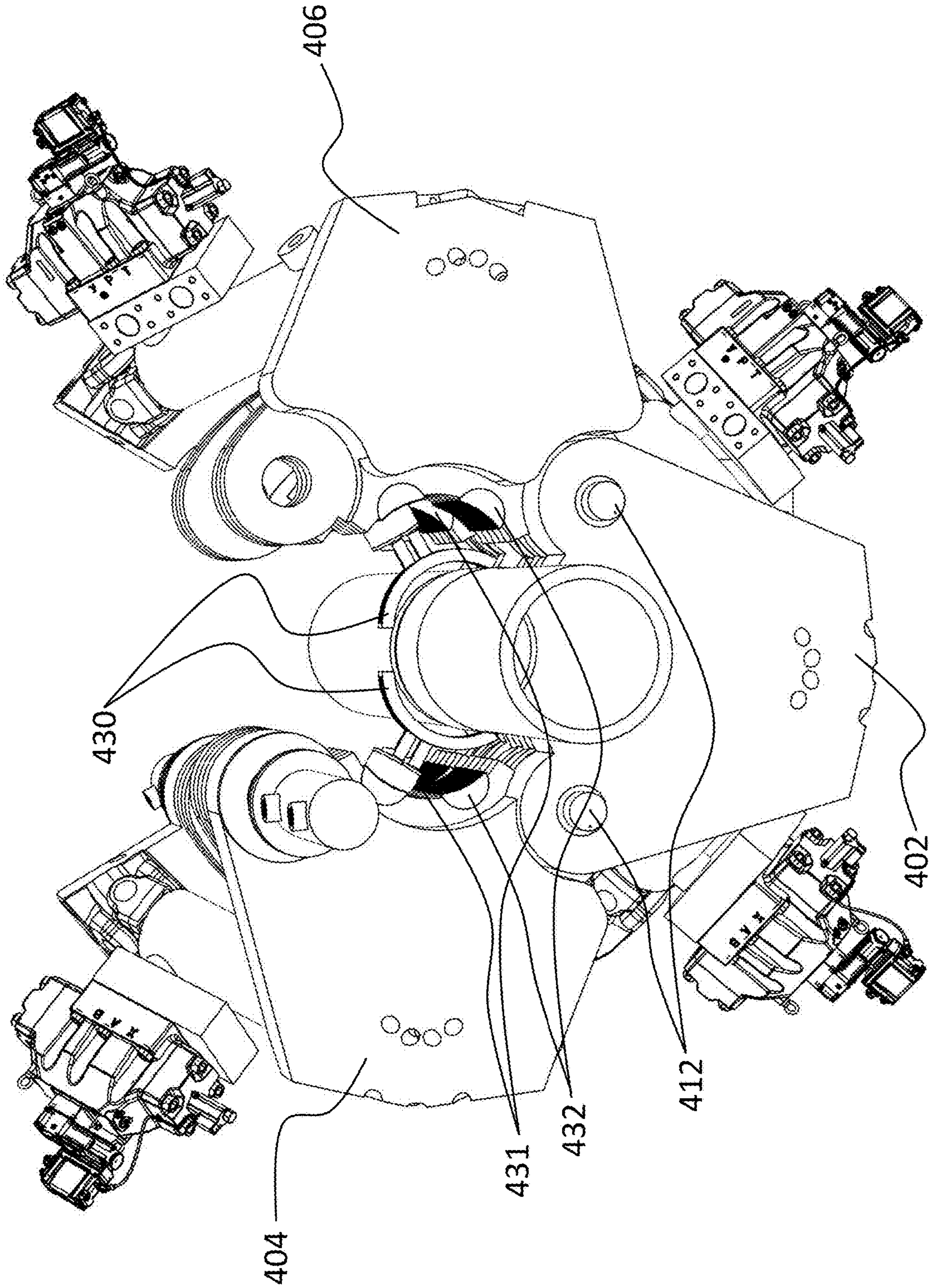

Figure 14, 6-DOF Clamshell IKW System Rear View
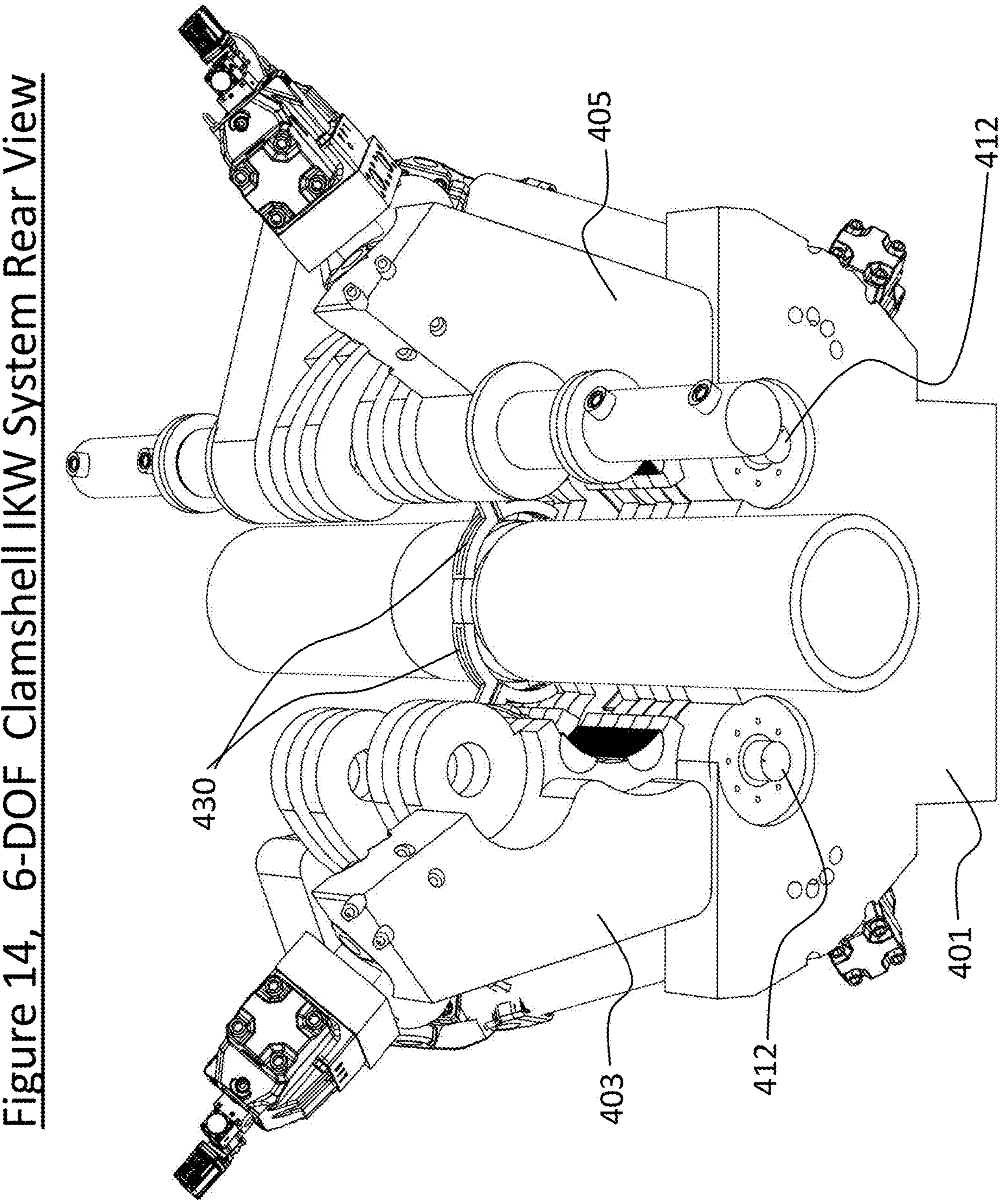

Figure 15, 6-DOF Clamshell IKW Eccentric Hinge Pin, 412
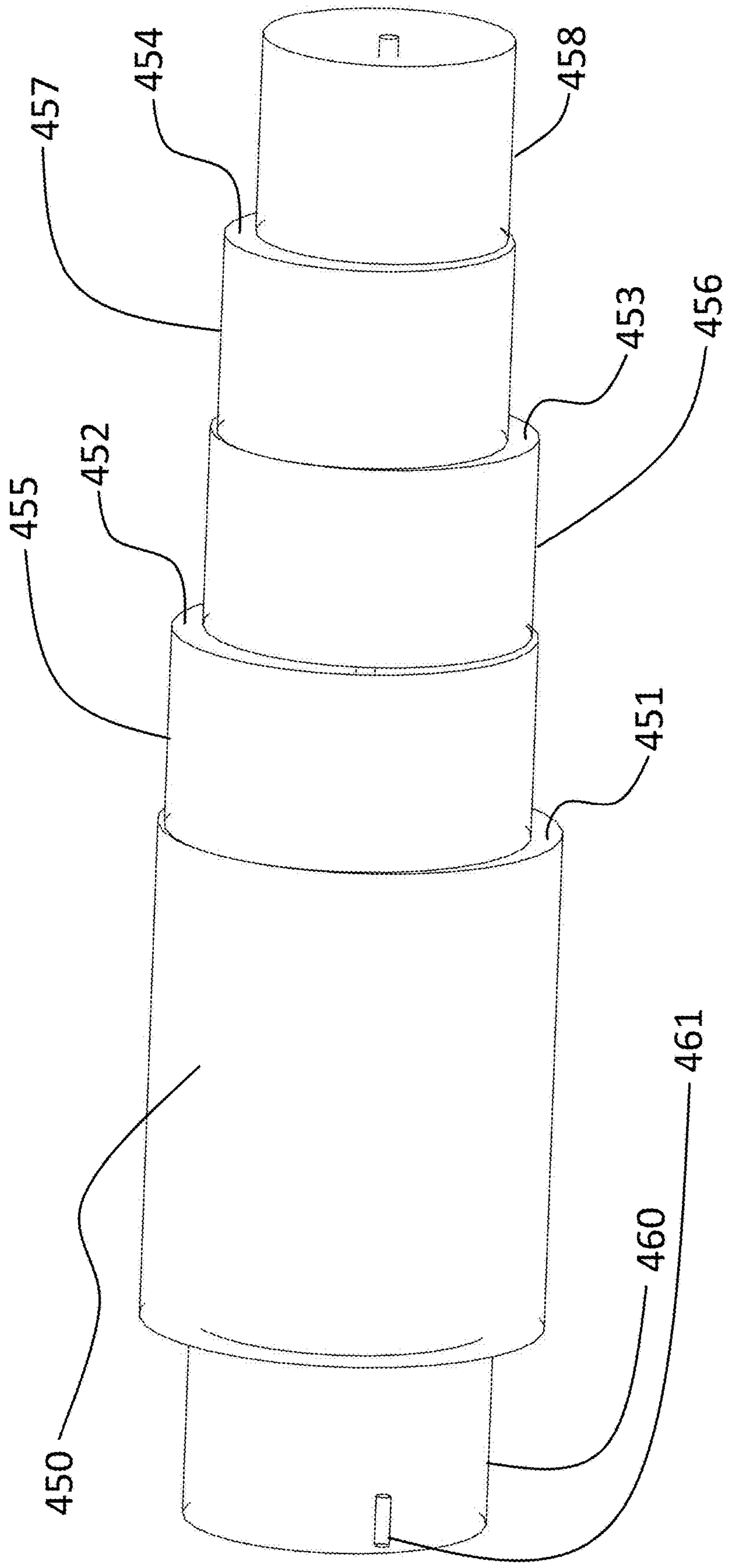

Figure 16, 1-DOF Z-Axis Feedthrough IKW System
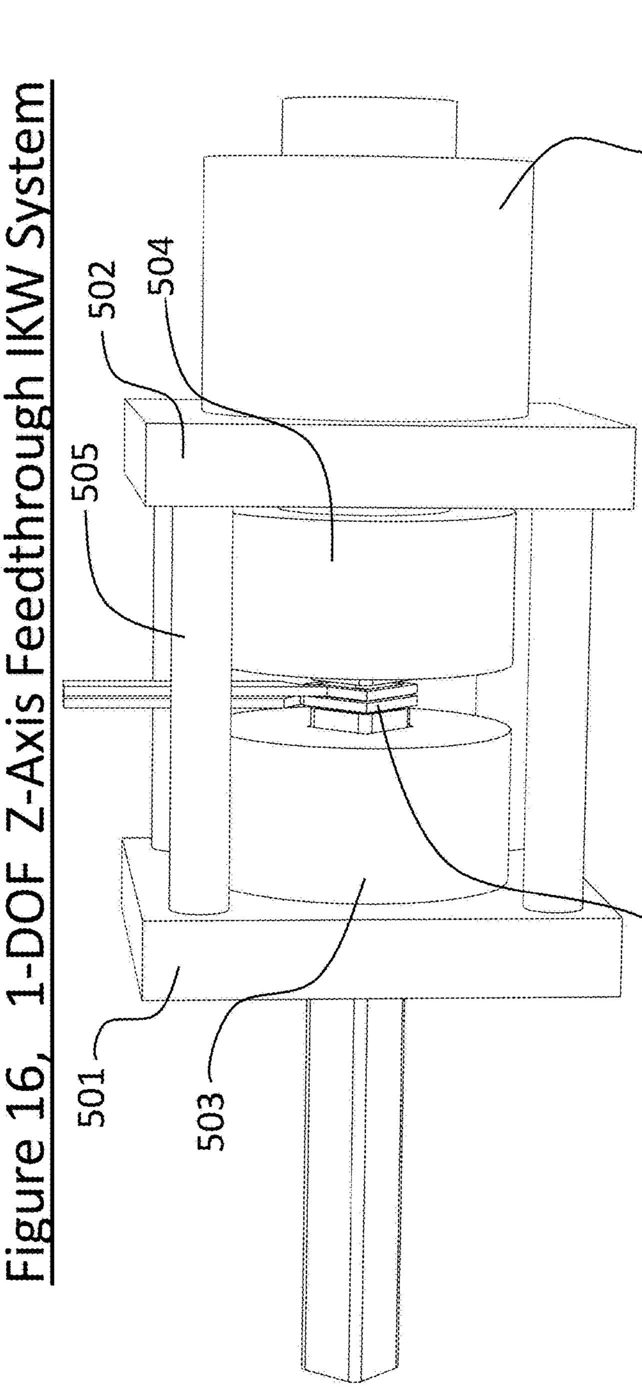
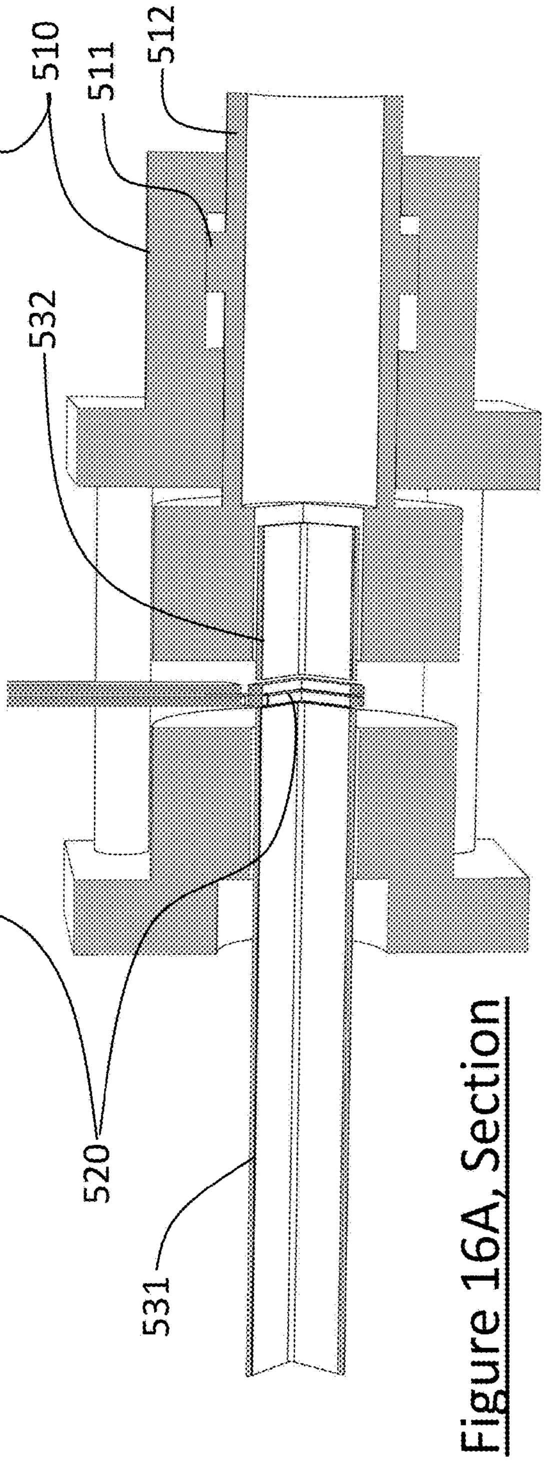
Figure 16A, Section Fig.17 Process & Machine Selection for Parallel Actuator Based IKW
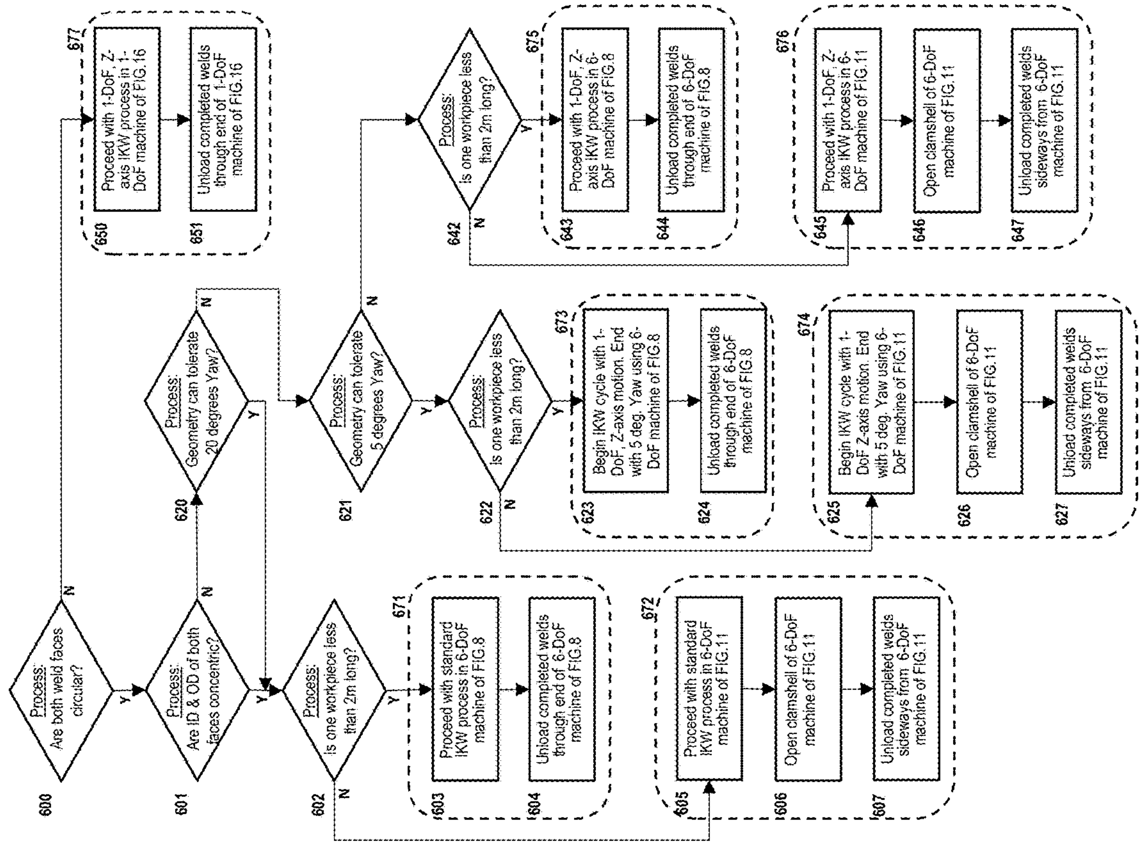

PARALLEL ROBOTICS SYSTEM AND METHOD OF INDUCTION KINETIC HYBRID WELDING PROCESSES

CROSS-REFERENCE TO RELATED APPLICATIONS

The subject patent application is a U.S. Nonprovisional Patent Application which claims priority to and all the benefits of U.S. Provisional Patent Application 63/305,231, filed on Jan. 31, 2022, the disclosure of which is hereby incorporated by reference.

FIELD OF THE INVENTION

The present invention generally relates to a new method and process of performing Induction-Kinetic Welding (IKW). More particularly, the invention combines parallel robotics with IKW to create an improved IKW system and process.

BACKGROUND

An IKW process is historically a category of welding reliant on Dynamic Recrystallization (DRX) occurring within a viscoplastic flow gradient, without ejecting any of the parent metal and without any sliding between the surfaces being joined. Conventional friction welding relies upon one surface being vigorously rubbed against another concurrent with a high normal force to generate frictional heating. By contrast, the IKW process uses non-contact induction heating to raise both surfaces to the hot forging temperature in a nonreactive atmosphere and then from the first instant that the surfaces make contact, there is instant bonding and zero sliding behavior. Instead, the interface area immediately goes into viscoplastic flow in response to any lateral motion. Also, the normal force averages near zero during lateral motion and in some instants the normal force is actually negative during the kinetic phase. Previously, embodiments of the IKW process have been based on coordinated motion between exactly two, orthogonally arranged actuators, to provide separate and independent axial motion and perpendicular rotary motion, thereby producing the required bare minimum Two Degrees of Freedom (2-DoF) for the motion control and also the kinetic heating for DRX required by IKW process. Crucially, known previous embodiments of the IKW process have relied upon some form of lateral shear (usually rotary) to achieve the kinetic heating to generate the required DRX.

Since it was first disclosed in U.S. Pat. No. 6,637,642, the IKW process has been characterized as a two-step welding process, starting with an induction heating step instantly followed by a kinetic forging phase. Historically, IKW has used some type of lateral shear motion to provide the required viscoplastic flow induced kinetic heating, immediately after induction pre-heating has raised the faying surfaces to the hot forging temperature. The kinetic phase is crucial to providing the DRX which is responsible for the unique, highly desirable smooth surface-morphology and refined internal microstructure of all IKW welds. The simplest way to introduce this lateral shear motion when welding tubular shapes is with rotational motion, while simultaneously regulating the axial position of the abutting weld faces. However, additional lateral shear motions such as orbital, reciprocating, etc. have also been suggested in the prior art. Although, various machine architectures may have been conceived, tested and used in laboratory and commercial deployments, all IKW machine types have shared the common characteristic of having just two (2) degrees of freedom, both under full closed loop control, and those have always been orthogonal axes, regardless of whether the IKW machine was designed for circular welds or linear welds and the corresponding lateral motions to generate the DRX have always been planar. Also, IKW machine architectures have relied upon a rigid frame structure through which to react the torsional and axial forces of the IKW process, for example by using a large diameter, heavy wall tubular structure as the welding chamber, with the workpiece-holding chucks anchored to each end of the tube. In other cases, a box frame comprised of rigid posts has been used. In this respect, the IKW process has retained this visible similarity to the much older process of Friction Welding (FW). Due to the large torsional and axial forces involved with both processes, it appears that all commercially operating Friction Welding (and Inertia Welding) machines likewise rely upon a very stiff box frame or tube frame to react the torque and axial loads occurring in the weld.

Another common characteristic of all known existing IKW machines is that long workpieces, for example anything over several diameters long had to be fed through the machine axially through one or the other end opening. Therefore, there remains an opportunity to improve the IKW process and machine architectures.

SUMMARY OF THE INVENTION

With the present invention, the combination of motion amplitudes, precise position control, lateral and axial forces, and lateral and axial velocities required for the IKW process are all achieved with Stewart Platforms, also known as Parallel Actuators, which typically have 6-DoF. In other words, according to the teaching of this invention, 6-DoF systems are used to generate the kinetic heating required to produce the DRX essential to the IKW process. Previously, it was not known whether 6-DoF parallel robotic systems would be capable of achieving the required accuracy of motion control while delivering the large forces at high velocities required to generate the crucial DRX. Therefore, it was necessary to reduce to practice in the form of a purpose-built prototype system, which is disclosed in FIGS. 8, 9, 10.

As a result of building and testing a 6-DoF prototype system for the IKW process, it was also discovered that a new welding process is possible which uses only axial (longitudinal) motion, in contrast to prior systems which rely upon some form of transverse shear motion (e.g. rotary). This is counter-intuitive because once the heated, opposing endfaces of the parts are brought into contact with each other, this discovery showed that the only motion generating the kinetic heating and resulting DRX is compressive and tensile axial oscillation. During the tensile phase of each oscillation, it would be expected that the nascent weld would be torn apart, yet this has been proven to be avoidable with careful parameter selection.

The present invention takes advantage of this new single axis IKW discovery in combination with the 6-DoF discovery to enable an entirely new spectrum of welding capabilities for the IKW process.

Many variations are possible with the present invention, therefore the simplest case of tube-to-tube girth welds will be the default weld geometry to be described in this disclosure, although a great variety of other configurations are now made possible.

It is the primary objective and advantage of this invention to expand the capabilities and/or increase the versatility of the IKW process, initially taught in U.S. Pat. No. 6,637,642, incorporated herein as if repeated word for word. As a more detailed review, the IKW process utilizes induction heating of the weld faces in a non-reactive atmosphere, quickly raising the faying weld surfaces up to the hot working temperature (typically in 10 to 20 seconds), which then are kinetically forge-welded in a single rapid action (typically a few seconds or less duration), joining the entire weld at the same instant. This is called a "one-shot" process because all the parameters which condition the endface of each pipe for welding are accomplished simultaneously on every square millimeter of each surface, across the full wall thickness and around the full circumference. Once the required temperature and depth of heating is reached during the induction heating step, then the entire circumference and wall thickness of the weld is then completed all at once, instead of incrementally as would be the case with conventional arc welding. It is the input of kinetic energy which is key distinction of IKW versus Friction Welding ("FW") or Inertia Welding ("IW") because instead of ejecting and wasting parent metal as happens in FW or IW processes, the IKW process conserves 100% of the parent metal in the final weldment. This is possible because the kinetic heating which is confined to the original preheated mass of parent metal keeps that hot zone well above the recrystallization temperature, but at the same time it is rapidly deforming the parent metal in this zone. Therefore, this combination of conditions results in highly desirable Dynamic Recrystallization ("DRX") which is the mechanism that produces the smooth macrostructure and refined internal microstructure during the viscoplastic flow in the hot zone. Viscoplastic flow also coalesces all the hot parent metal involved in the weld into a smooth transition zone between the two workpieces and prevents any metal from being ejected from the weld, in stark contrast to what happens with conventional friction welding. For the IKW process to achieve DRX, it is critical that the kinetic heating equals or exceeds the energy being lost from the weld zone through axial conduction plus convective and radiation losses. In the present invention, this will continue to be referred to generically as the Induction-Kinetic Welding or "IKW" process. Although the present invention is applicable to many different geometries of symmetric and asymmetric welds, both circular as well as rectilinear, the following disclosures and descriptions will primarily cite the simplest case of round, tubular, butt welds for joining pipe to pipe, also known as girth welds.

Previous embodiments of the IKW process have relied upon machine architectures designed using elements of serial robotics wherein each orthogonal motion axis is exclusively achieved by a dedicated actuator. Typically, those independent actuators are stacked one upon the other in "serial" arrangement and the forces they generate (torsional and axial) are reacted through a very stiff external frame or tube structure. Prior to the present invention, in order to achieve the IKW process, the minimum possible number of motion axes are two; axial (linear) plus lateral (such as rotary)—said two axes ideally being exactly perpendicular to each other. By contrast to prior art, serial robotic embodiments, the present invention relies on the principles of Parallel Robotics where multiple actuators operating in co-ordination with each other all share the tasks of whatever number of orthogonal motions are involved. Instead of reacting the torque and axial forces through a rigid static frame, the parallel actuators inherently provide that stiff external frame, but now it is a dynamic frame, like an exoskeleton instead of a static frame. In the domain of Parallel Robotics, the best-known configuration is the Stewart Platform which uses six (6) linear actuators, typically with spherical or universal joints on each end to create an octahedral, active frame structure, capable of the full six (6) degrees of orthogonal freedom existing in 3-dimensional space, those being translational X, Y, Z, plus rotational Roll, Pitch and Yaw (R, P, Y). But there is no reason why a parallel robotics system cannot exceed six (6) actuators, for example to increase the forces it generates. The next five paragraphs will explain the advantages and potential improvements to the basic 2-DoF IKW process by having a full 6-DoF, active structure architecture.

When conventional autogenous welding (e.g. Friction Welding, Forge Welding, Upset Welding, etc.) is used to join metal parts, there is an unavoidable re-shaping and re-alignment of the microstructure due to the axial compression which is essential to all those processes. For example, when butt-welding tubular cross sections, the original typical elongated microstructure along the length axis of the tube (similar to the wood grain in a tree trunk) tends to become shortened and more equi-axed, which is also known to happen in the IKW process. Friction Welding ("FRW") represents an extreme case where the resulting weld zone microstructure gets completely squashed into a cross axis orientation, creating what amounts to a metallurgical notch, centered on the bond plane and is very undesirable. One of the advantages of the present invention is that it enables several methods by which the IKW process can adjust the final microstructure during the kinetic phase, to minimize grain shortening which otherwise occurs in the two principal cross axis directions of circumference and wall thickness. For example, a pipeline butt weld would commence the kinetic phase with reciprocating rotary strokes (typically about 1 to 10 centimeters amplitude) and after about 20 to 40 cm of effective total lateral shear has accumulated, then the motion would instantly be switched to small amplitude (typically about 2 mm) orbital motion with declining amplitude until the temperature of the weld zone drops below the point at which the actuators have sufficient force to effect any plastic deformation. The diminishing orbital motion thereby "gyrates" each grain of the microstructure into a more column-like shape. Alternatively, the orbital motion could be replaced with a nutating motion with similar declining amplitude. It may also be advantageous to combine orbital motion with nutating motion. Yet another alternative is to utilize the newly discovered method of straight axial oscillations which completely eliminate any lateral shear motions but still provide the required kinetic heating which enables DRX.

Another advantage is the ease with which machine architectures based on Parallel Actuators can be designed to split open laterally to enable loading and unloading of welds from the side. Previous designs of IKW welding systems required that long workpieces must be fed longitudinally through the welding machine ("Feedthrough") because the rotary axis and chucks and welding chamber structure are all too difficult to bisect without greatly complicating the design and severely weakening the whole machine. This restricts the types of welds which can be made. For instance, in spoolbase welding for offshore pipelines, it is feasible, though not preferred to make all of the welds comprising each pipe stalk with a Feedthrough design. However, when it comes time to join the stalks together, it is not practical to feed the long stalks through the welding machine. Instead, a sideloading design is required which is described in the Detailed Description section below. Were it not for this goal of sideloading capability, it would not have been necessary to reduce to practice by designing and building the prototype mentioned at the beginning of this Summary and fully detailed in FIGS. 8, 9 and 10. That is because the operational needs of a feedthrough architecture could be met by combining a 6-DoF parallel robotic system with a powerful rotary actuator mounted on either of the platforms, thus creating a 7th axis. What has not been anticipated is that a 6-DoF parallel robotic system could be capable of delivering the necessary kinetic energy input, without a 7th axis, while maintaining adequate accuracy of position during high speed, high force motions.

Yet another advantage of the present invention is the ability to instantly transition between the entire range of theoretically possible motion types, even within a time window as brief as one or two seconds as in the kinetic phase of the typical IKW process. As previously taught in U.S. Pat. No. 6,637,642, the most obvious choice of motion to use for tubular butt welds is rotary motion, even though other motions such as orbital were included in the claims. With the conventional IKW machine designs, it would require dedicated machinery subsystems to generate each of those two motion types whereas the present invention can produce rotary or orbital or nutating motions with equal ease, and also is able to instantly switch between these distinct motions. Moreover, the present invention is also capable of achieving complex hybrid motions, for example a combination of orbital plus rotary-reciprocal, resulting in an elongated orbital-type motion profile. Another possible complex motion is nutating disc motion. It has been learned with the IKW process that axial conduction cooling of the workpieces is extremely rapid, dropping from the ideal hot forging temperature range (e.g. 1,200 C for steels) to hundreds of degrees below that where the IKW process is no longer viable in a about a second after cessation of kinetic energy input. Therefore, the ability to instantly switch between motion modes is crucial to avoid the large temperature drop which would otherwise occur during any pause between motion types. If this capability of multimodal motion were to be added to a serial robotics machine architecture, it would sacrifice a lot of machine stiffness with each additional motion type and require the addition of a lot of mechanical complexity. Conversely, with a 6-DoF parallel robotics machine, these complex motion capabilities are inherently available and only require some extra lines of programming to be achieved, without any mechanical additions or changes to the machine, and all without sacrificing any machine stiffness.

From the preceding paragraphs, it should be clear there are numerous key advantages to a having a new, more versatile method of executing the key steps of the IKW process, in which simultaneous, closed loop control of all six motion axes (X, Y, Z, Roll, Pitch, Yaw) will be instantly possible. To date, all IKW machines that have been built can be classified as "Serial Robotics" architecture, wherein each of the two principal axes is independently constructed and controlled and each must be strong enough to bear the full forces of the payload and in which the errors within each axis are additive. In contrast, Parallel Robotics has the inherent advantage that the dynamic forces are shared by the multiple actuators and errors among the multiple actuators are averaged instead of being additive. Within the broad family of Parallel Robotics, the most familiar type is the Stewart Platform which achieves the full 6-DoF by an octahedral arrangement (trigonal antiprism) of six cylindrical joint linear actuators. Stewart Platforms are active truss structures, well suited to the requirements of IKW because inherently they are extremely stiff and precise, while still enabling the 6-DoF. The main tradeoff versus Serial Robotics is a much smaller range of motion, but this is no problem for the IKW process because it does not require large amplitude motions. High stiffness is crucial for being able to deliver the massive torque (e.g. >50,000 N-m) during IKW welds, but high positioning accuracy (e.g. 0.1 mm) is equally crucial for maintaining required alignment during the induction heating phase as well as during the kinetic phase. High velocity and acceleration/deceleration is the third critical requirement for IKW and this requirement is amplified by the fact that if the actuators are configured to be surrounding the workpieces of the weld, then there will be at least a tripling of the moment arm radius from weld perimeter to the nodes of the actuators. This means that for a given perimeter velocity in the weld, the parallel actuators will have to achieve at least 3× that velocity at the nodes. Conversely for the case of very large diameter welds, it may be advantageous to configure the actuators inside of the workpieces, but then the actuators must be capable of much higher forces, though at lower velocity. Typically, the individual actuators are hydraulic or electromechanical, but other types are also possible, such as piezoelectric, pneumatic, linear motors, etc. Anything less than six parallel actuators will result in an under-constrained system and that would be absolutely unworkable for achieving the IKW process. Conversely, more than six actuators will result in an over-constrained system which will require modestly more complex control algorithms to coordinate the actuators, however, it will be fully capable of achieving the IKW process and in some cases will have important advantages. For specialized IKW applications such as very large diameter or very heavy wall thickness, it often will be preferable to design Parallel Robotic machines with more than six actuators. However, the most optimal design for very simple weld configurations in medium sizes, e.g. 10 cm to 50 cm, are best satisfied by Parallel Robotic machines with exactly six actuators. To minimize the number of variations discussed in the following Detailed Description, the preferred embodiments will utilize six parallel actuators in an octahedral configuration, thereby providing precisely 6-DoF.

It has also been discovered that a new welding process is possible which uses only a single (1) axis of motion (1-DoF), after the opposing surfaces have been heated to the hot forging temperature. It is achieved by oscillating the parts with respect to each other longitudinally along the axis, which typically is perpendicular to the bond plane, after the induction heating phase has brought the opposing surfaces up to the hot forging temperature in the usual non-reactive atmosphere. This is counter-intuitive because it means that once the heated, opposing endfaces of the parts are brought into contact with each other, then the only motion is compressive and tensile oscillation. Conventional wisdom says that the nascent weld would be pulled apart with every oscillation cycle when the force turns tensile. Further, when this new 1-DoF axial motion IKW process is used in combination with a 6-DoF machine at the start of the kinetic phase of the IKW process, it becomes possible to produce high quality welds with highly non-circular cross section. This enables any cross-section geometry to be butt welded by IKW without being restricted to circular cross section and even including geometries which do not have rotational symmetry.

These, as well as other components, steps, features, objectives, benefits, and advantages, will now become clear from a review of the following detailed description of illustrative embodiments, the accompanying drawings, and the claims.

BRIEF DESCRIPTION OF THE DRAWINGS

Advantages of the invention will be readily appreciated as the same becomes better understood by reference to the following detailed description when considered in connection with the accompanying drawings, wherein:

FIG. 1A is a process graph of a 6-DoF IKW process with a damped real weld;

FIG. 1B is a process graph of a 6-DoF IKW process with an undamped "air weld";

FIG. 1C is a process graph of a Magnified View of Practice Run #CR0005;

FIG. 1D is a process graph of a Magnified View of Weld #XPW0005;

FIG. 2 is a process graph for a single axis IKW;

FIGS. 3 through 7 are schematic representations of some of the potential different parallel actuator configurations which could be integrated with the IKW process. In all five of these examples, neither the induction components nor the workholding components are shown since they will be detailed in subsequent figures. It is the differences in the kinematics made possible by the parallel actuators which are highlighted in these figures. Regardless of the configuration, these are all 6-DoF systems, with the six axes represented by legend 200.

FIG. 3 is a schematic of a standard configuration 6-DoF parallel actuator;

FIG. 4 is a schematic of a trunnion configuration 6-DoF parallel actuator;

FIG. 5 is a schematic of an inverted configuration 6-DoF parallel actuator;

FIG. 6 is a schematic of a circular tripod array 6-DoF parallel actuator;

FIG. 7 is a schematic of a rectangular tripod array 6-DoF parallel actuator;

FIG. 8 is a perspective view of a 6-DoF feedthrough IKW system;

FIG. 9 is a perspective view of a 6-DoF feedthrough IKW weld chamber;

FIG. 10 is a perspective view of an induction coil segment in FIG. 9;

FIG. 11 is a perspective front oblique view of a 6-DoF clamshell IKW system;

FIG. 12 is a perspective back oblique view of a 6-DoF clamshell IKW system;

FIG. 13 is a perspective front view of a 6-DoF clamshell IKW system;

FIG. 14 is a perspective rear view of a 6-DoF clamshell IKW system;

FIG. 15 is a perspective view of a 6-DoF clamshell IKW eccentric pivot pin;

FIG. 16 is a perspective view of a 1-DoF Z-axis feedthrough IKW system;

FIG. 16A is a cross sectional view of the 1-DoF Z-axis feedthrough IKW system of FIG. 16; and FIG. 17 is a flowchart of a method of the invention for process and machine selection for parallel actuator based IKW.

For the purposes of promoting an understanding of the principles of the embodiments, reference will now be made to the embodiments illustrated in the drawings and specific language will be used to describe the same. It will nevertheless be understood that no limitation of the scope of the embodiments is thereby intended. Any alterations and further modifications in the described embodiments, and any further applications of the principles of the embodiments as described herein are contemplated as would normally occur to one skilled in the art to which the embodiment relates.

DETAILED DESCRIPTION OF THE DRAWINGS

In the following diagrams and models, the Z-axis is defined in respect to octahedral 6-DoF Parallel Actuators as the axis which runs from the geometric center of the base platform (a.k.a. first stage) upward through the geometric center of the moving platform (a.k.a. second stage). Positive Z therefore means the platforms are moving apart and negative Z means they are moving together. The other 5 axis follow from this orientation as indicated by the legend 200.

FIG. 1A and FIG. 1B outline the process by which IKW is achieved using kinetic energy input entirely provided by the 6-DoF Parallel Actuators, that is without a 7th rotary axis. With a prototype 6-DoF system performing the IKW process, there is much greater risk it could damage itself compared to any conventional 2-DoF IKW machine, especially considering possible electromagnetic interference from the induction heating coils in close proximity to the hydraulic servocontrol valves might cause them to go wildly out of control. Therefore, the standard operating procedure was to perform a Practice Run of any new set of welding parameters. In this safe mode, there was always a small gap maintained between the weld faces. Further, the initial practice run was performed at slow speed, typically half speed or less, to confirm stability and control, after which a full speed practice run was made and analyzed as shown in FIG. 1A. Once satisfactory stability and control were confirmed in the practice runs, an actual weld was executed using the identical control parameters, as shown in FIG. 1B. Both of these figures are recorded graphs of the actual command and response signatures which is important because of the following comparative observations. Dotted line 50, is $Z_T$ Target Position which is the command position between the two opposing pipe ends along the Z-axis of the 6-DoF as a function of time. Corresponding to that is the actual response, solid line 51, showing $Z_A$ Actual Position. In FIG. 1A, there is always a gap between the two opposing pipe ends, so in this Practice Run, they never actually come into contact with each other, but at $Z_{NC}$ Near Contact Position 58, there is about 1 cm between the endfaces. At this point, the rotary oscillations on the Yaw axis commence, with YT, the dotted line, Yaw Target 52 and the solid line YA, the Yaw Actual 53 recorded as shown in both the Practice Run, FIG. 1A and Weld #XPW0005, FIG. 1B. In the actual weld there is an instant of real contact, marked as $Z_C$ Contact Position 59. Regardless of whether there is a gap or there is an actual weld being produced, it is notable that the Yaw graphs are identical, and both have virtually zero tracking error after the first ¼ cycle (90 degrees Yaw). By contrast, the Z graphs show a distinct and surprising difference. FIG. 1A shows a definite, consistent positive Z overshoot spike about ⅛ cycle (about 45 degrees) after each Yaw reversal whereas in FIG. 1B, these Z spikes have been almost completely damped out. In both figures, there is still overshoot of negative Z which is being caused by unrefined tuning characteristics of the 3 extending hydraulic cylinders interacting with the 3 retracting hydraulic cylinders when they all must instantly reverse direction at the end of each Yaw oscillation. Magnified views of Practice Run #CR0005 and Weld #XPW0005 are provided in FIG. 1C and FIG. 1D respectively. The obvious difference is that both the amplitude and area of the Actual Position 51 over the dotted line 50 Target Position is several times more in CR0005 as compared to XPW0005. The important fact here is that the positive Z damping can only be explained by the nascent weld having significant tensile strength, sufficient to cause viscous damping, right from the very first Yaw oscillation. This observation led to the subsequent experimental results detailed in FIG. 2 where welds are performed with only Z-axis motion to achieve the kinetic heating to drive the DRX of the IKW process.

Together, FIGS. 1A, 1B, 1C and 1D confirm with an actual weld 165 mm diameter by 6 mm wall thickness that parallel robotics are capable of achieving simultaneous high speed, high force and high accuracy motion necessary to generate the required kinetic heating which is necessary for stable DRX. In this case the yaw speed at the weld was 170 mm/sec and the shear force in the weld was about 70 MPa while the Z position was maintained to with 1 mm. On the prototype machine, the pitch diameter at which the linear actuators are attached is about 960 mm, therefore since weld XPW0005 had a diameter of 165 mm, the yaw speed at the universal joints was about 5.8 times faster, about 725 mm/sec. Yet at this high speed, the system was able to maintain the required positioning accuracy within 1 mm while also achieving the high shear force required for successful IKW welds.

Since the single axis of motion (1-DoF) method for IKW can be incorporated into the operation of many machine architectures to enable complex geometry welds, it will also be described before all of the apparatus schematics and models since any of them could be operated in a 1-DoF mode to initiate any IKW weld program.

FIG. 2 outlines the process by which DRX driven IKW is achieved using only a single axis of motion (1-DoF). The Abscissa represents time in seconds and the total cycle duration as illustrated is typically about 10 seconds. The Ordinate represents the axial position, Z of the two opposing pipe ends with respect to each other, typically starting about 50 mm apart to allow space for the induction coil segments to be positioned between the pipe ends. Line 104 is the axial or Z-Position of the moving pipe end with respect to the fixed pipe end. Line 103 is the temperature at the endface of the abutting pipes, which prior to the instant of contact 107 is actually two separate but almost identical temperatures. After movement along the Z axis to cause contact between the two endfaces 108, line 103 becomes the temperature at the axial Centerplane of the weld which normally has the highest temperature within the entire weldzone. Induction preheating of the pipe ends continues until both endfaces reach the target Hot Forging temperature at time 106 which triggers retraction of the induction coil segments so that the hot pipe ends can quickly be brought into contact with each other at $Z_C$ Contact Position 108. Ideally the hot endfaces are brought into contact with critically damped motion as depicted and only a small amount of overshoot, about 0.1 mm but sufficient to generate a small amount of deformation and measurable compressive reaction force of about 50 to 100 MPa. At this position, the Z motion is briefly held (on the order of 1 second) from $t_C$ 107 to $t_S$ 109 to allow as much high temperature Static Diffusion bonding as possible. Before the Centerplane temperature drops below the critical hot forging temperature for the particular alloy being welded, small oscillations parallel to the Z axis commence, in the range of 0.1 to 0.5 mm total amplitude. The first half cycle can be either negative (tensile) as shown or positive (compressive) depending on how effective the preceding diffusion bonding is. But generally, it is preferable to start with positive Z motion to minimize the probability of rupturing the nascent weld. If the oscillations do not have sufficient amplitude and/or speed, then the kinetic heating will not be sufficient to prevent the temperature of the Centerplane from decreasing, albeit at a slower decline than during the Static Diffusion stage, as shown by sloped line segment AB 113. It is preferable to impose oscillations of sufficient amplitude and/or speed such that the kinetic heating is sufficient to cause a slight temperature rise at the Centerplane, as witnessed by the positive slope of line segment CD 114. However, it is crucial not to exceed a critical amplitude defined as the Rupture Strain, $Z_{RS}$ 112 because that will destroy the weld. In the example illustrated, the oscillations are increased to Maximum Amplitude $Z_{MA}$ 111 in order to achieve positive slope 114 of Centerplane temperature resulting from the kinetic heating. Positive slope is important because it permits the oscillations to be continued indefinitely which enables extended duration of DRX. After the prescribed duration of axial oscillations, all motion and kinetic heating can be arrested as shown to complete the weld cycle, as would be the case for complex geometry welds which cannot accommodate any lateral motions such as rotations or orbital motions. Alternatively, for many welds with intermediate complexity, the aforementioned purely axial kinetic heating is the ideal method by which to begin an extended weld cycle which after segment CD would instantly transform into some preferred translation motion, for example short stroke rotations of a few degrees or orbital motions. The advantage of this combination is that by starting with purely Z axis oscillations, the edge boundaries of the starting endfaces can be fully coalesced into a smoothly blended transition and once fully formed, by extending the kinetic heating with lateral motions allows improved microstructure in the weld. Another case where this sequential combination would be desirable would be some alloys for which the Rupture Strain, $Z_{RS}$ is too low to allow enough kinetic heating to enable positive slope, thus limiting the duration of Z oscillations. By transitioning to lateral motions, after segment AB, it becomes possible to input further kinetic heating to fully develop the weld bond.

By definition, parallel robotics depends on 6 or more identical actuators being mechanically joined together in parallel with each other to collectively achieve motion in 6-DoF in a single stage. This is a key distinction from serial robotics where at least 6 actuators would be stacked one on top of the other, generally with each consecutive actuator having its motion axis perpendicular to the one upon which it is mounted. Therefore, each additional actuator tends to be smaller and unique since the mass and moment arm which it must work with are smaller than the those of the actuator it is mounted on. Since all of the actuators in a given parallel robotic system are identical, a simplification has been made FIGS. 3 through 14 by only labelling one or two of the obviously identical parts instead of the usual practice of labelling all identical parts. Arguably it should be possible to design a serial arrangement of six actuators to achieve 6-DoF, commonly known as SCARA industrial robots for IKW. But in practical reality, these would have two major disadvantages; a) it would be nearly impossible to design a serial arrangement of six actuators to have sufficient stiffness to react the typical forces involved with either FW or IKW, and b) errors in the positioning accuracy of each actuator is additive with the other five actuators and therefore it would be nearly impossible to design a serial robotics 6-DoF system with sufficient position control accuracy for successful welds. Therefore, SCARA type architectures were quickly discarded in the present invention.

Parallel robotics is a mature technology, consequently there are many established control strategies and available systems of computer hardware and software known to those skilled in the art to successfully operate a given parallel robotic machine. Therefore, these elements are not discussed or claimed in this invention.

The following five FIGS. 3 through 7) provide an overview of possible different geometries for achieving the kinetic heating, in the form of simplified schematic representations to convey the differences in the kinematics. For simplicity and clarity, the induction heating components and the workpiece holding components are not shown. In all five cases, they are capable of 6-DoF motions consisting of the three orthogonal translational motions X, Y, Z plus the three orthogonal rotational motions, Roll, Pitch, Yaw which are defined by the legend 200. These five figures are not an exhaustive listing of the possible geometries, since these are limited to arrangements with either circular or rectangular symmetry. It is understood that additional geometries are possible which would be asymmetric, for example arc-segments or "S" shaped segments.

FIG. 3 is a schematic representation of a typical 6-DoF Stewart Platform comprised of a stationary base platform 201 connected to a moving platform 202 by six identical linear actuators 207 set at opposing angles in two sets of three actuators attached at or near the outer perimeter 205, 206 of both platforms, usually at equal intervals of 120 degrees. Each actuator 207 is a cylindrical joint which has two degrees of freedom—sliding along and rotating about a common axis. Most commonly they consist of an outer tube containing a coaxial inner rod (or tube) 211. At each end of the cylindrical joint there is a pivoting mechanism, illustrated for simplicity as a spherical joint 208, 209 (but alternatively could be a universal joint) to transmit the axial compressive and tensile forces to the adjoining platform. The spherical joints 208, 209 have been illustrated with two different sizes simply to differentiate the larger diameter outer tube 207 from smaller diameter coaxial inner rod 211 but in physical reality, the pivoting mechanism would normally be identical size on both ends of each actuator. This is true regardless of whether the pivots are spherical joints or universal joints and is the case also for FIGS. 4, 5, 6, 7. FIG. 3 illustrates the base case of the present invention, where two workpieces to be joined would be gripped by an application specific type of chuck (not shown) in the opening 203 and 204 at the center of each platform which would grip the workpieces on the outer surface by applying clamping force in the radial inward direction toward the geometric center of each platform 201 and 202.

FIG. 4 is a schematic representation of a typical 6-DoF Stewart Platform comprised of a stationary base platform which uses trunnion style spherical bearings 210 on the linear actuators 207 instead of the more common end-mounted actuator housing bearings 208. Otherwise, they are mounted to the stationary base platform 201 and moving platform 202 in similar manner and location as shown in FIG. 3 with a stationary base platform 201 connected to a moving platform 202 by six identical linear actuators 207 set at opposing angles in two sets of three actuators attached at or near the outer perimeter 205, 206 of both platforms, usually at equal intervals of 120 degrees. The main advantages of the trunnion mounting configuration is that it enables much closer spacing between the two platforms and allows wider range of motions with respect to the roll, pitch and yaw axes.

FIG. 5 is a schematic representation of an inverted 6-DoF Stewart Platform comprised of a stationary base platform 201 connected to a moving platform 202 by six identical linear actuators 207 set at opposing angles in two sets of three actuators, similar to FIG. 3 except that they are attached at or near the inner perimeter 203, 204 of both platforms, instead of at the outer perimeter 205, 206. Gripping of the workpieces would occur at the outer perimeter 205 and 206 of each platform by applying clamping force in the radial outward direction away from the geometric center of each platform 201 and 202. The main advantage of this inverted configuration is that it is better suited for very large diameter, thin wall applications. In this case of the present invention, the two workpieces being joined would be gripped by application specific type chucks (not shown) which would grip each of the two large diameter tubes on their inside surface.

FIG. 6 is a schematic representation showing how 6-DoF actuator systems can be comprised of multiple subsets of identical clustered linear actuators. Since the strongest truss geometry has exactly three chords on any facet, the simplest dynamic space truss (3-dimensional) will be a tetrahedron where three of the facets have dynamic chords on two edges and the remaining fourth facet 222 is rigid on all three chords. As a base unit, this will be referred to as a "dynamic tripod." FIG. 5 shows the simplest arrangement of three such tetrahedrons arranged in a symmetric circular array. The workpieces for such a system would be held by application specific chucks which could be attached to the inward facing surface of each of the two opposed platforms 220 and 221. A major advantage of the tetrahedron clusters is that they can be quickly adapted to an unlimited variety of circular symmetric applications in terms of sizes to be welded by attaching additional identical dynamic tripods. For example, to double the weld diameter (for the same wall thickness), conventional design practice tends to go the direction of specifying actuators which have twice the force output. But if the linear actuators are hydraulic cylinders, there is a practical limit for the corresponding size of servocontrol valve which is available. So instead, it is preferable to double the number of the original size dynamic tripods.

FIG. 7 is a schematic representation showing how 6-DoF actuator systems can be comprised of dynamic tripods arranged in a rectangular array. A simple 2×3 rectangular array of dynamic tripods is illustrated in FIG. 6. The workpieces for such a system could be held by application specific chucks which would be attached to the inward facing surface of each of the two opposed platforms 230 and 231. Similar to the case of circular arrays in FIG. 5, the dynamic tripods can be quickly adapted to a virtually unlimited variety of linear and rectangular applications in terms of sizes and shapes to be welded simply by attaching additional dynamic tripods where needed to satisfy the increased demand for kinetic energy input.

FIG. 8 is a 3D CAD model of the prototype R&D hydraulic machine built to test and prove the ability of 6-DoF actuator systems to provide the necessary kinetic heating for IKW, without using a 7th axis to provide rotation. For clarity, this view of the model has suppressed all components of the induction heating system, leaving just the essential kinematic components to be seen. This is a feedthrough machine architecture meaning that long workpieces, for example long pipes being joined would need to be moved axially into position through the center opening at the top and bottom of the machine. In the vertical orientation shown, the only way for long workpieces to be loaded and unloaded from the machine is up or down through the vertical center axis of the machine and this is an important limitation which will be addressed in detail starting with FIG. 11. Feedthrough architecture 6-DoF machines are generally most useful for mass production applications in factories, for example the manufacture of drill pipe in which case the machine would be oriented with the center axis being horizontal instead of the vertical orientation shown in FIG. 8. Consistent with schematic FIG. 3, there is a stationary base platform 301 connected to a moving platform 302 by six identical linear actuators 307 (hydraulic cylinders) set at opposing angles in two sets of three actuators attached near the outer perimeter 305 and 306 of both platforms, at equal intervals of 120 degrees. In this example the six identical hydraulic servocontrol valves 308 were directly mounted on the hydraulic cylinders for maximum hydraulic stiffness, but alternatively they could be mounted on or near the base platform 301, with the tradeoff that the further away they are from the hydraulic cylinders, the more there will be sponginess in their high-speed response characteristics. This is where electromechanical actuators would have an advantage, since there can be a much greater separation between the electric actuator and the electric amplifier/driver without slowing the response characteristics of the assembly. For the prototype, a simplified radial bolting type of chuck 309 and 310 was mounted on base platform and moving platform respectively. Application specific workpiece holding chucks of various types, for example hydraulic or electromechanical known to those skilled in the art of conventional friction welding would be installed in place of 309 and 310 on any commercial machine. Articulation of both ends of each linear actuator is achieved with universal joints 311. Alternatively, ball joints could be used. The prototype machine as shown was able to achieve +/−30 degrees of rotation which together with its inherent speed, force and positioning accuracy during the 6-DoF motions proved to be ample capabilities to generate the kinetic heating required to achieve sustainable DRX of the IKW process. The endfaces of the two opposing workpieces are identified as 316. Three identical induction coil segment units detailed as 320 in FIG. 10 would be attached at three identical mounting pads 315.

FIG. 9 is a cutaway view of the same R&D prototype hydraulic machine of FIG. 8 with the kinematic components suppressed and instead showing details of the induction heating system components. Each induction coil segment unit, detailed in FIG. 10 has its subframe 351 mounted on a precision pad location 315 visible on FIG. 8. During the induction heating phase of the IKW process, the slidable portion 342 of each induction coil segment unit is moved radially inward until the adjacent endfaces 343 of the induction coils come into close proximity with each other, but always with a thin dielectric ensuring there is no electrical contact between the adjacent endfaces 343. Once the workpiece ends have been heated to the required hot forging temperature, the slidable portion 340-343 of each induction coil segment unit 320 is quickly moved radially outward until it is fully clear of the outside diameter of the workpiece, thus allowing the induction heated endfaces of the workpieces to be quickly brought into contact with each other through a Z-axis motion of the 6-DoF system During the induction heating phase, high frequency power is delivered to all three of the induction coil segments by the rigid copper buss bar dipole pair 321 as shown but alternatively can be delivered by flexible coaxial cables or closely paired Litz cables. The controlled atmosphere of non-reactive gas such as argon is contained within the purge chamber constituted by transparent panels 322 and upper and lower polygon plates 323 which fit tightly around each chuck body 309.

FIG. 10 is a detailed view of the one of the three identical induction coil segment units identified in FIG. 9 as item 320. It consists of a slidably movable induction coil segment 340 with magnetic flux concentrator material 341 all encased in a rigid dielectric material such as phenolic 342. These items comprise a rigid subassembly 340-343 which slides on dielectric rods 352 when actuated by pneumatic actuator pair 350 which are anchored on rigid subframe 351 comprised of rigid dielectric material such as phenolic. Subframe 350 is mounted on chuck body 309 at location 315 in FIG. 8. Magnetic flux concentrator material 341 is important for evening the magnetic field where the three identical copper induction coil segments meet at their endfaces 343 to even out the current flows induced into the endface of both workpieces.

FIG. 11 shows a 3D CAD model (front oblique view) of an innovation enabled by the 6-DoF capability to generate DRX in the present invention. This is a clamshell architecture to enable sideways loading and/or unloading of workpieces. Clearly this architecture would not be practical if a 7th rotary axis were required to achieve the necessary kinetic heating for the resulting DRX of the IKW process. Since the 6-DoF system is inherently able to generate all the necessary kinetic heating, this makes it possible to hinge both the stationary and the moving platforms in a simple way to enable side loading and unloading of long parts, as opposed to having to feed them through the center axis of the machine as required for FIG. 7. This is a vital requirement for applications such as pipeline construction in both onshore and offshore field environments. Superficially, this clamshell 6-DoF architecture appears very similar to the feedthrough architecture of FIG. 7 considering the six identical hydraulic cylinders 207 and six identical servocontrol valves 308 and universal joints 311 joining the base platform to the moving platform. However, to achieve the clamshell opening capability, the base platform 401 and the moving platform 402 have both been laterally trisected by means of two stacked plate base hinges 413 with permanent pins 412 and one apex hinge 421 for the base platform with a retractable pin 420 which is extended/retracted by linear actuator 422. Similarly, the moving platform is trisected but, in this case, the three sections 402, 404, 406 are very similar with two identical stacked plate hinges 417. The apex hinge 425 of the moving platform has its hinge pin extended/retracted by linear actuator 426. The moving platform 402 acts as a rigid structure when its hinge pin is extended by linear actuator 426. Similarly, the stationary base platform 401 acts as a rigid structure when its hinge pin is extended by linear actuator 422. The functionality of hinging the base platform and the moving platform effectively adds one more DoF to each platform. Similarly, the eccentric shafts 412 described below in which generate the clamping force provide one more DoF to each platform. Therefore, in total the clamshell architecture is considered to have 10 DoF when including the modes of opening/closing and clamping/unclamping. However, once the clamshell has been closed and clamped, then it operates with only 6 DoF during the actual weld cycle.

FIG. 12 is a rear oblique view of the same machine as FIG. 11 to provide clear view of components obscured in FIG. 11 including the apex hinge pin 424 of the moving platform, the permanent hinge pins 412 of the base platform, the back end of the stacked plate hinges 413 and the base platform 401.

The distinguishing difference of the clamshell architecture versus the feedthrough architecture is made evident in FIG. 13. It shows the front view when both platforms are opened for loading/unloading by means of the stacked plate hinges pivot on the eccentric hinge pins 412. In this configuration two of the three identical induction coils 430 can be seen as can the pivoting jaws 431 on the base platform and the pivoting jaws 432 on the moving platform. Similarly, FIG. 14 shows the rear view in the same hinged-open position. In both views, it is clear that the weld-joined pipes can be lifted vertically out of the cradle of the machine once the induction coils 430 have been fully retracted radially outward although they are shown in the extended position in FIG. 14. Another important feature of the clamshell architecture is the permanent hinge pins 412 which all have a stepped geometry of alternating eccentric journals as detailed in FIG. 15. With these eccentric journals it is a simple matter to achieve high clamping forces by rotating each hinge pin up to 180 degrees by a high torque rotary actuator, not shown but known to those skilled in the art. The two permanent hinge pins for each platform can be identical to maximize the range of motion during the clamping operation or alternatively one pin can have smaller amplitude eccentrics to increase the clamping force at the sacrifice of the stroke range of the clamping operation. To accommodate the slight rocking motion of the trisected platform segments with respect to each other during clamping, each segment has embedded semicircular jaws 431 for the base platform and 432 for the moving platform. The entire jaw is hardened with a smooth, bearing journal quality finish on the convex surface, but a roughened surface (or profiled tooth pattern) on the concave surface to maximize traction on the workpieces.

FIG. 15 is a typical detail view of the four identical eccentric shafts 412 which have the dual functions of hinging the main clamshell segments, 403, 405 in FIGS. 14 and 404, 406 in FIG. 13 as well as providing the high clamping force required for the IKW process. During these closing and clamping operations, the apparatus has an additional four (4) degrees of freedom for a total of 10-DoF. But once the segments have been closed, pinned, and clamped, then the apparatus is restricted to 6-DoF for the duration of the weld cycle, identical to the feedthrough architecture of FIG. 8. Clamping force is generated when the clamshell segments 403, 405, 404, 406 are all in the closed position and pinned together by the retractable pins 420. In this condition, the eccentric shafts 412 are rotated by up to 180 degrees in the main bearing journal 450 which always remains concentric with stepped down journals 456 and 458 during all such rotation. Equal amplitude eccentrics at 451, 452, 453, 454 are designed as consecutive matched pairs, set at exactly 180 degrees opposing each other so that when the pin rotates, the stepped down journals 455 and 457 are concentric with each other and describe an orbital motion when rotated, which either draws the clamshell segments into a tighter ID circle or enlarges them into a bigger ID circle. Rotation of the eccentric shafts is affected by any suitable high torque rotary actuator (not shown) attached to the drive extension 460 and one or more keyways 461.

FIG. 16 shows a basic 1-DoF machine. As the DoF classification implies, this is the simplest of all possible architectures able to execute the IKW process and it can work with as few as two moving parts during the weld cycle (not counting clamping mechanisms in the two chucks). All it requires is an axially stiff box frame consisting of a base plate 501 connected to a spindle plate 502 by three or more posts 505. There are no torsional forces in the 1-DoF process. Axial motion is provided in this schematic with an annular hydraulic ram 510 having a hollow spindle 512 with piston 511 and attached chuck 504, but for short workpieces, a solid spindle is also acceptable. The axial motion of the moving chuck 504 is achieved by alternately pumping fluid to the opposite sides of the piston 511. Opposing this is the static chuck 503 and in between the faces of these chucks is sufficient space for the induction coil 520. A one-piece coil is satisfactory for small diameter capacity versions intended for welds less than about 30 cm across. Larger welds benefit from multi-segment coils since they reduce the time required to retract the coil from between the endfaces of the workpieces 531 and 532. Not shown is the purge containment feature which can be as simple as a cylindrical sleeve which encircles both chucks and having a wiper seal to accommodate the axial motion of the spindle chuck. There would also be a purge dam of some type inside of both workpieces, near the endface being welded. Square cross section workpieces are shown but it is understood that this 1-DoF architecture could have many versions specifically designed by those skilled in the art for other cross section geometries which are incompatible with even small Yaw motions. As with all IKW variations, non-reactive shielding gas is essential for this 1-DoF IKW process to produce successful welds. Argon or Helium are preferred but for some alloys, nitrogen and possibly carbon dioxide are sufficiently inert to succeed.

FIG. 17 is a flowchart providing a simplified decision tree for selection of optimal process sequences for the kinetic motion essential to the IKW process and the corresponding best suited machine architecture. This is necessary to accommodate a potentially infinite number of weld cross section geometries and workpiece lengths. The requirements for inert gas shielding and induction heating remain consistent and very similar essentials for every process variation illustrated in FIG. 17, therefore are not mentioned in this diagram to simplify the analysis. Likewise, all variations illustrated depend upon there being sufficient kinetic heating to generate viscoplastic flow and the resulting DRX. However, the kinetic parameters for the weld cycles and therefore the machine architecture are application specific and shown as seven potential branches 671-677 in the decision tree. Taken together, these seven process options represent the full spectrum of new methods in the present invention to achieve DRX in the IKW process. It is to be understood that for simplicity, the decisions have all been shown as binary choices, but in the real world there are bound to be weld geometries which are best performed contrary to this decision tree. For example, Decision 602 does not address the case where both workpieces might be 5 meters long because under certain circumstances it could be advantageous to weld these intermediate length parts using the feedthrough architecture of FIG. 8.

When both weld faces are circular 600 with concentric ID and OD 601 and at least one of the workpieces is less than about 2 meters long 602, the most efficient machine architecture will be a feedthrough machine similar to that shown in FIG. 8. This is the most familiar version compared to the prior art IKW process. The crucial distinction is that in 671, the IKW is achieved without any rotary axis—all the kinetic energy input is achieved with just the 6-DoF. The most suitable applications for this will be factory manufacturing applications such as welding tool joints (typically about 1 meter long) onto the long pipes (typically 10 meters long) which form the main body of typical drill pipe.

However, if both of the workpieces are long (10 to 15 meters long), as would be the case for pipeline construction in the field, then it becomes important to be able to unload the completed welds without feeding 10 to 15 meters of pipe through the welding machine. This becomes even more vital if there is thick coating on the pipe, for example thermal insulation which can be several inches thick. Feedthrough machines like FIG. 8 suffer loss of capacity due to thick coatings. Therefore, it is highly advantageous to use a clamshell architecture similar to FIG. 11 for long parts as outlined in 672. Being able to rapidly open up as shown FIG. 13 after every weld in order to unload the completed weld is key distinction of this machine architecture.

Decision 620 becomes important if the weld faces have ID and OD which are eccentric. For workpieces which are less than about 30 cm diameter, the preferred minimum amplitude of rotation induced shear (yaw) is about 20 degrees. Whether or not eccentric weld faces will tolerate this depends on the exact geometry as well as the acceptance criteria for the application with regard to ID roughness of the weld. Often this will require trials to measure the tolerance in the actual material and geometry to be welded. If 20 degrees proves to achieve acceptable weld quality, then the best option is found by returning to Decision 601 followed by Decision 602 as discussed in the foregoing.

Still discussing eccentric geometry, the next Decision 621 determines whether a hybrid kinetic process is a viable solution. If 5 degrees of yaw is tolerable, then there are two independent ways to induce kinetic heating, namely starting with pure Z axis motion for a few seconds followed by short amplitude yaw of 5 degrees. Since these two motion axes are orthogonal, they represent additive methods for inducing kinetic heating and attaining the vital DRX. Experiments have proven that starting eccentric welds with pure Z axis motion helps to blend the ID and OD edges of the weld endfaces. Then adding in short amplitude yaw increases the kinetic heating and improves the overall weld properties through the effects of DRX. Similar to Decision 602, there still the matter of the parts length at 622. Long parts should still be welded in a clamshell architecture 674, whereas if one of the parts is only a few meters long, then a feedthrough machine 623 should be able to achieve quicker cycle times and thereby higher productivity.

If the weld geometry cannot tolerate even 5 degrees of yaw (assuming parts less than about 30 cm diameter) then the only process option is pure Z axis kinetic heating. Generally, there will be no technical reason why the 1-DoF process cannot be performed with 6-DoF machines which are more likely to be available and will already have the tooling for gripping workpieces with round OD. The same length-based decision of 602 and 622 also applies at 642. Clamshell machines like FIG. 11 have more complexity and cost and slower cycle times compared to feedthrough architectures like FIG. 8.

Going back to Decision 600, if the parts are not round, for example square, rectangular, highly elliptical or have large variations in wall thickness, then likely the best choice of kinetic process is entirely Z axis motion 677. In this case, more specialized machines such as illustrated in FIG. 16 can be built to purpose. This design is mechanically the simplest possible of all IKW architectures with as few as just 2 moving parts, counting the induction coil but not counting internal components of the chucks.

Besides the preceding cases described by FIG. 17, there are innumerable other potential machine architectures presented schematically in FIG. 3 to FIG. 7. It is believed that the associated weld geometries will be infrequent, so the decision tree does not include those cases. But the common feature of all of those machine architectures is that all have 6-DoF which inherently is capable of providing the kinetic energy necessary for DRX, without adding an extra axis such as a rotating head or linear reciprocating head.

The invention has been described in an illustrative manner. It is to be understood that the terminology which has been used, is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A method of induction-kinetic joining of two metal parts, said method comprising:

retaining a first metal part having a first endface in association with a first stage of an apparatus;

retaining a second metal part having a second endface in association with a second stage of the apparatus, wherein the apparatus comprises a plurality of linear actuators between the first stage and the second stage, wherein the first stage is in six degrees of freedom of motionable association with the second stage, wherein the apparatus is adapted to rapidly and precisely motion with high forces the first endface and the second endface in six degrees of freedom relative to an X, Y, Z axes, wherein the Z axis projects through a center of the first endface and the second endface, wherein the apparatus provides for motioning the first endface and the second endface translationally in an X, Y, and Z direction and rotationally in a Roll, Pitch and Yaw (R, P, Y) motion relative to each other;

in a controlled, non-reactive atmosphere, heating the first endface and the second endface with an induction heater to a temperature suitable for induction-kinetic welding;

forcing the first endface onto the second endface and motioning the first endface and the endface in at least one of translationally and rotationally until a dynamic recrystallization occurs within a viscoplastic flow gradient of the first endface and second endface, wherein the first endface is joined to the second endface.

2. The method of claim 1, wherein the first metal part and the second metal part are tubular.

3. Welded tubular parts of the method of claim 2.

4. The method of claim 1, comprising six linear actuators.

5. The method of claim 1, wherein the plurality of linear actuators are in a octahedral array between the first stage and the second stage.

6. The method of claim 1, wherein the plurality of linear actuators are in a polygonal array between the first stage and the second stage.

7. The method of claim 1, wherein the first stage and the second stage comprise a hinged access adapted to open and close to allow placing the first metal part in the apparatus prior to the step of retaining the first metal part having the first endface in association with the first stage and placing the second metal part in the apparatus prior to the step of retaining the second metal part having the second endface in association with the second stage.

8. The method of claim 1, further comprising:

motioning the first endface in at least one of an orbital motion and a nutating motion with the second endface.

9. The method of claim 1, further comprising:

controlling with a computer enabled control system the step of motioning the first endface and the endface in at least one of translationally and rotationally until a dynamic recrystallization occurs within a viscoplastic flow gradient of the first endface and second endface, wherein the first endface is joined to the second endface.

10. A parallel robotics apparatus for induction-kinetic welding, the apparatus comprising:

a first stage and a second stage movably disposed in a frame, wherein the first stage aligns with a first plane and the second stage aligns with a second plane;

a plurality of linear actuators having an outer tube containing a coaxial articulating rod, wherein the tube is a first end and a distal end of the coaxial articulating rod is a second end of the linear actuators, wherein one of the first end and the second end of the plurality of linear actuators are movably disposed in the first stage and the other of the first end and the second end are movably disposed in the second stage, wherein the first stage and the second stage are movable within six degrees of freedom of each other including where the first plane and the second plane are co-planer;

a first chuck disposed in a middle portion of the first stage and a second chuck disposed in a middle portion of the second stage, wherein the first chuck is adapted to retain a first workpiece to be induction-kinetic welded to a second workpiece retained in the second chuck, wherein the apparatus is adapted to motion the first chuck and the second chuck translationally in an X, Y, and Z direction and rotationally in a Roll, Pitch and Yaw (R, P, Y) motion relative to each other, wherein the apparatus is adapted to rapidly and precisely motion the first workpiece and the second workpiece against each other translationally and rotationally until a dynamic recrystallization occurs within a viscoplastic flow gradient of the first workpiece and the second workpiece.

11. The parallel robotics apparatus for induction-kinetic welding of claim 10, wherein the plurality of linear actuators are six.

12. The parallel robotics apparatus for induction-kinetic welding of claim 10, wherein the first stage, the second stage, the first chuck and the second chuck comprise a pivotable portion adapted to pivot open to allow loading the first workpiece into the first chuck and the second workpiece into the second chuck.

13. The parallel robotics apparatus for induction-kinetic welding of claim 10, wherein the plurality of linear actuators comprise a first pivoting mechanism on the first end and a second pivoting mechanism on the second end.

14. The parallel robotics apparatus for induction-kinetic welding of claim 10, wherein the plurality of linear actuators are in a octahedral array between the first stage and the second stage.

15. The parallel robotics apparatus for induction-kinetic welding of claim 10, wherein the plurality of linear actuators are in a polygonal array between the first stage and the second stage.

16. The parallel robotics apparatus for induction-kinetic welding of claim 10, wherein the plurality of linear actuators comprise one or more of hydraulics, electromagnetic actuators and piezoelectric actuators adapted to provide a required force at a required velocity and control accuracy.

17. The parallel robotics apparatus for induction-kinetic welding of claim 10, wherein the induction heater is comprised of three induction coil segments each spanning an arc of 120 degrees, which can slidably be advanced between opposed workpieces during heating and retracted out of the way for the kinetic phases to take place and which are connected in series to an induction power supply.

18. The parallel robotics apparatus for induction-kinetic welding of claim 10, wherein the induction heater is comprised of two induction coil segments each spanning an arc of 180 degrees, which can slidably be advanced between opposed workpieces during heating and retracted out of the way for the kinetic phases to take place and which are connected in series to an induction power supply.

19. The parallel robotics apparatus for induction-kinetic welding of claim 10, wherein the induction heater is comprised of a plurality of induction coil segments each spanning an arc such that collectively they comprise 360 degrees, which can slidably be advanced between opposed workpieces during heating and retracted out of the way for the kinetic phases to take place and which are connected in series to an induction power supply.

20. The parallel robotics apparatus for induction-kinetic welding of claim 10, wherein the zone around the ends of the workpieces is enclosed to permit the introduction and maintenance of a controlled non-reactive atmosphere during the induction heating phase and the kinetic heating phase and the transition between the two phases of the induction-kinetic welding process.

* * * * *